United States Patent
Kurosawa

(10) Patent No.: US 8,816,626 B2
(45) Date of Patent: Aug. 26, 2014

(54) MOTOR DRIVE CONTROL DEVICE AND OPERATING METHOD THEREOF

(71) Applicant: Renesas Electronics Corporation, Kanagawa (JP)

(72) Inventor: Minoru Kurosawa, Kanagawa (JP)

(73) Assignee: Renesas Electronics Corporation, Kawasaki-shi, Kanagawa (JP)

(*) Notice: Subject to any disclaimer, the term of this patent is extended or adjusted under 35 U.S.C. 154(b) by 0 days.

(21) Appl. No.: 13/755,467

(22) Filed: Jan. 31, 2013

(65) Prior Publication Data
US 2013/0193899 A1  Aug. 1, 2013

(30) Foreign Application Priority Data
Jan. 31, 2012  (JP) ................................. 2012-017930

(51) Int. Cl.
*H02P 1/00* (2006.01)
(52) U.S. Cl.
USPC ...... 318/504; 318/430; 318/434; 318/400.34; 318/400.04
(58) Field of Classification Search
USPC ............. 318/400.01, 400.04, 400.11, 400.22, 318/400.34, 430, 434, 717, 496, 504
See application file for complete search history.

(56) References Cited

U.S. PATENT DOCUMENTS

| | | | |
|---|---|---|---|
| 6,344,721 B2 | 2/2002 | Seki et al. | |
| 6,759,827 B2 * | 7/2004 | Kawashima | 318/727 |
| 7,411,365 B2 | 8/2008 | Kurosawa et al. | |
| 7,535,188 B2 * | 5/2009 | Fukamizu et al. | 318/254.1 |
| 7,667,419 B2 * | 2/2010 | Fukamizu et al. | 318/400.34 |
| 7,723,937 B2 * | 5/2010 | Kurosawa et al. | 318/400.34 |

FOREIGN PATENT DOCUMENTS

| | | |
|---|---|---|
| JP | 2001-275387 A | 10/2001 |
| JP | 2006-115599 A | 4/2006 |
| JP | 2008113506 A | 5/2008 |

* cited by examiner

*Primary Examiner* — Bentsu Ro
*Assistant Examiner* — Thai Dinh
(74) *Attorney, Agent, or Firm* — McDermott Will & Emery LLP

(57) ABSTRACT

Motor Drive Control Device configured to properly start up various types of motors under operating conditions where motor operations are performed in a wide range of temperature and power supply voltage, includes output drive controllers that supply PWM drive output signals to an output pre-driver in such a manner as to minimize the error between a current instruction signal and a current detection digital signal. In response to a detected induced voltage generated from a voltage detector upon startup of a motor, an initial acceleration controller supplies initial acceleration output signals specifying a conducting phase for initial acceleration of the motor to the output drive controllers. The initial acceleration controller, the output drive controllers, and an output driver make a conducting phase change and perform a PWM drive to provide the initial acceleration of the motor.

20 Claims, 14 Drawing Sheets

MOTOR DRIVE CONTROL DEVICE AND OPERATING METHOD THEREOF

CROSS-REFERENCE TO RELATED APPLICATIONS

The disclosure of Japanese Patent Application No. 2012-017930 filed on Jan. 31, 2012 including the specification, drawings, and abstract is incorporated herein by reference in its entirety.

BACKGROUND

The present invention relates to a motor drive control device that drives a three-phase DC motor. The present invention also relates to a method of operating the motor drive control device. More particularly, the present invention relates to a technology effective for properly starting up various types of motors under operating conditions where motor operations are performed in a wide range of temperature and power supply voltage.

A brushless three-phase DC motor is used as a spindle motor for rotating a magnetic disk of a hard disk drive (HDD). The spindle motor rotates the magnetic disk at a high speed, positions a read/write magnetic head close to the surface of the rotating magnetic disk, and moves the magnetic head in the radial direction of the magnetic disk to write information on the magnetic disk and read the information written on the magnetic disk.

When a brushless three-phase DC motor was subjected to drive control in the past, a Hall element was used to detect the positional relationship between a rotor (rotating part) and a stator (stationary part). Reverse motor rotation was prevented by determining an appropriate conduction start phase by selecting it from three coil phases in accordance with the detected positional relationship. However, when a rotor position detector based on the Hall element was incorporated in the motor, it was difficult to reduce the size of the motor. Hence, a sensorless DC motor was frequently used for the hard disk drive. If the positional relationship between the rotor and the stator is not properly determined at the beginning of rotation, such a sensorless DC motor may cause the rotor to rotate in a reverse direction.

A conduction start phase determination method described in Japanese Unexamined Patent Publication No. 2001-275387 sequentially supplies a short pulse current in a forward direction and in a reverse direction to the extent that a rotor does not respond to the field coil of each phase of a brushless motor, combines a voltage induced during a forward-direction supply with a voltage induced during a reverse-direction supply, which are both developed in a non-conducting phase, determines the polarity of the combined induced voltage, and determines a conduction start phase in accordance with the determined polarity. The induced voltage is a voltage that is induced on a field coil of a stator by the magnetic field lines of a magnet for the rotor in accordance with the positional relationship between the rotor's magnet and the stator's field coil. Currents flowing to the field coils of two out of three phases are sequentially alternated between forward direction and reverse direction to compare the resulting induced voltages. This makes it possible to determine which of the field coils of the two phases is closer to a pole of the rotor's magnet and determine whether the pole is an S-pole or an N-pole. Meanwhile, the reverse voltage (back electromotive voltage) of the motor is a voltage that is developed across a field coil of the stator in proportion to a revolving speed when the rotor's magnet rotates in a magnetic field of the stator's field coil. The reverse voltage of the motor is essentially different from the induced voltage of the motor.

FIG. 13 in Japanese Unexamined Patent Publication No. 2006-115599 and the description given with reference to this figure deal with motor startup control that includes a sequence of initial rotor position identification and conducting phase determination by a three-phase sense, motor drive by conduction, rotor movement verification by a three-phase sense, motor drive by conduction, rotor movement verification by a three-phase sense, and motor drive by conduction. The three-phase sense is accomplished by supplying a short pulse current in the forward direction and in the reverse direction to the extent that the rotor does not respond, subjecting an induced voltage developed in the remaining non-conducting phase to analog-to-digital conversion, and adding up the results of analog-to-digital conversion with an integrating register.

In the first three-phase sense for identifying an initial rotor position, the polarity of an induced voltage in each non-conducting phase of a total of three phases is determined to determine the conduction start phase in accordance with the determined polarities of the induced voltages in the three phases. When the motor is driven by initial conduction, the field coils of two phases that are determined as a conduction start phase by the first three-phase sense is energized for a relatively short predetermined period of time to subject the motor to a first initial acceleration. The second and third three-phase sense operations are performed to check for the reversal of polarity of an induced voltage concerning the next detection phase, which is determined from the conduction start phase.

FIG. 3 in Japanese Unexamined Patent Publication No. 2008-113506 and the description given with reference to this figure deal with a motor startup method that reduces the time required for motor startup by preventing the generation of noise during motor startup, which is determined by the sum of a three-phase sense detection period for initial acceleration described in Japanese Unexamined Patent Publication No. 2006-115599 and a conduction period for motor drive. In other words, the polarity of an induced voltage in each non-conducting phase of a total of three phases is determined by one three-phase sense operation, as is the case with the description given in Japanese Unexamined Patent Publication No. 2006-115599, and the conduction start phase is determined in accordance with the determined polarity of the induced voltage in each of the three phases. In subsequent PWM drive for conduction for motor drive, the induced voltage developed in a non-conducting phase is detected so that the conducting phase is changed in response to the detection of the peak of the induced voltage. Even after the conducting phase is changed, the peak of the induced voltage developed in a non-conducting phase during motor drive is continuously detected. The detected peak is then used to time a phase change for the purpose of accelerating the motor.

SUMMARY

Before the disclosure of the present invention, the inventors of the present invention have been engaged in the development of a semiconductor integrated circuit called a motor driver IC that rotates a magnetic disk of a hard disk drive (HDD) capable of starting up various types of motors under a wide range of operating conditions.

The development has been conducted in a situation where it is demanded that various types of motors properly start up without regard to a wide range of changes in the temperature and in the power supply voltage. However, the inventors engaged in the development have found that when the motor startup method described in Japanese Unexamined Patent Publication No. 2008-113506 is used, it is difficult to properly start up various types of motors under operating conditions where motor operations are performed in a wide range of temperature and power supply voltage.

FIG. 13 is a diagram illustrating the configuration of a motor drive control device for driving a three-phase DC motor, which has been studied by the inventors of the present invention before its disclosure.

As shown in FIG. 13, voltage sources, which equivalently exhibit reverse voltages B-emf (U), B-emf (V), B-emf (W), are coupled to one ends of stator coils of a motor (MT) 1, namely, a U-phase stator coil LU, a V-phase stator coil LV, and a W-phase stator coil LW. The other ends of the U-phase stator coil LU, V-phase stator coil LV, and W-phase stator coil LW of the motor (MT) 1 are commonly coupled as a midpoint.

The motor drive control device shown in FIG. 13 includes a virtual midpoint generator 2, an induced voltage detector 3, an A/D conversion section 4, an initial acceleration controller 5, an output drive controller 6A, a PWM modulator 6B, a drive voltage generator 6C, a parameter setup register 7A, a serial port 7B, an output driver 8, a current detector 9A, and a sense amplifier 9B.

The stator coils LU, LV, LW of the three-phase motor (MT) 1 are PWM (Pulse Width Modulation)-driven by the output driver 8. More specifically, the output driver 8 includes a spindle output pre-driver 81, pull-up power MOSFETs M1, M2, M3, and pull-down power MOSFETs M4, M5, M6. The U-phase stator coil LU of the motor (MT) 1 is driven by the pull-up power MOSFET M1 and the pull-down power MOSFET M4. The V-phase stator coil LV of the motor (MT) 1 is driven by the pull-up power MOSFET M2 and the pull-down power MOSFET M5. The W-phase stator coil LW of the motor (MT) 1 is driven by the pull-up power MOSFET M3 and the pull-down power MOSFET M6. The spindle output pre-driver 81 is driven by output control signals UPWM, UHIZ, VPWM, VHIZ, WPWM, WHIZ, which are generated from the output drive controller 6A.

A motor drive current for the three-phase motor (MT) 1 is detected by using the current detector 9A, which is formed by a DC shunt resistor Rsns. One end of the DC shunt resistor Rsns is coupled to a common source of the three pull-down power MOSFETs M4, M5, M6 of the output driver 8 while the other end of the DC shunt resistor Rsns is coupled to a ground voltage. Therefore, the motor drive current $I_{SENSE}$, which flows to the common source of the three pull-down power MOSFETs M4, M5, M6 of the output driver 8, is converted to a voltage by the DC shunt resistor Rsns of the current detector 9A. The voltage is amplified by the sense amplifier 9B. A current detection voltage CRNTOUT of the sense amplifier 9B is supplied to an A/D converter 4B through a selector 4A of the A/D conversion section 4. An error between a current detection digital signal at the output ADCOUT of the A/D converter 4B and a current instruction value supplied from the parameter setup register 7A is calculated by the drive voltage generator 6C, and a drive voltage VDRV corresponding to the error is supplied from the output of the drive voltage generator 6C to the input of the PWM modulator 6B. In response to the drive voltage VDRV, the PWM modulator 6B supplies a PWM signal to the input of the output drive controller 6A. Hence, the output drive controller 6A generates the output control signals UPWM, UHIZ, VPWM, VHIZ, WPWM, WHIZ, which PWM-drive the power MOSFETs of the output driver 8. The current instruction value of the parameter setup register 7A can be set, for instance, from a microcontroller external to the motor drive control device shown in FIG. 13 through the serial port 7B.

Consequently, if the motor drive current $I_{SENSE}$ detected by the DC shunt resistor Rsns of the current detector 9A is smaller than the current instruction value of the parameter setup register 7A, the drive voltage generator 6C is controlled so as to increase the VDRV signal at the output of the drive voltage generator 6C. Hence, the duty of the PWM signal at the output of the PWM modulator 6B increases to increase the motor drive current. If, on the contrary, the motor drive current detected by the DC shunt resistor Rsns of the current detector 9A is greater than the current instruction value of the parameter setup register 7A, the drive voltage generator 6C is controlled so as to decrease the VDRV signal at the output of the drive voltage generator 6C. Hence, the duty of the PWM signal at the output of the PWM modulator 6B decreases to decrease the motor drive current. In other words, the difference between the motor drive current $I_{SENSE}$ detected by the current detector 9A and the current instruction value of the parameter setup register 7A is detected to adjust the duty of the PWM signal at the output of the PWM modulator 6B until the difference decreases to zero. The output drive controller 6A then generates a PWM drive control signal for driving the power MOSFETs of the output driver 8 to control the motor drive current $I_{SENSE}$.

The virtual midpoint generator 2 includes three resistors $R_U$, $R_V$, $R_W$. One ends of the three resistors $R_U$, $R_V$, $R_W$ are coupled to one ends of the stator coils LU, LV, LW of the motor (MT) 1. When the resistance values of the three resistors $R_U$, $R_V$, $R_W$ of the virtual midpoint generator 2 are set to the same resistance R, the voltage at the other ends of the three resistors $R_U$, $R_V$, $R_W$ is a virtual midpoint voltage that is substantially equal to the midpoint potential of the other end to which the U-phase stator coil LU, V-phase stator coil LV, and W-phase stator coil LW of the motor (MT) 1 are commonly coupled.

The induced voltage detector 3 includes a selector 31, an amplifier 32, and a sample-and-hold circuit 33. The selector 31 includes a first switch SW1, a second switch SW2, and a third switch SW3. One end of the first switch SW1 is coupled to one end of the U-phase stator coil LU of the motor (MT) 1 and to one end of the resistor $R_U$ of the virtual midpoint generator 2. One end of the second switch SW2 is coupled to one end of the V-phase stator coil LV of the motor (MT) 1 and to one end of the resistor $R_V$ of the virtual midpoint generator 2. One end of the third switch SW3 is coupled to one end of the W-phase stator coil LW of the motor (MT) 1 and to one end of the resistor $R_W$ of the virtual midpoint generator 2. The three other ends of the first, second, and third switches SW1, SW2, SW3 of the selector 31 are commonly coupled to a noninverting input terminal+ of the amplifier 32. The virtual midpoint voltage at the other end to which the three resistors $R_U$, $R_V$, $R_W$ of the virtual midpoint generator 2 are commonly coupled is supplied to an inverting input terminal— of the amplifier 32. A selection signal SEL generated from an induced voltage determination section 51 of the initial acceleration controller 5 provides on/off control of the first, second, and third switches SW1, SW2, SW3 of the selector 31. A signal output from the amplifier 32 of the induced voltage detector 3 is supplied to the input terminal of the sample-and-hold circuit 33. A detected induced voltage VMOUT, which is a sample-and-hold output signal at the output terminal of the sample-and-hold circuit 33, is supplied to the A/D converter 4B through the selector 4A of the A/D conversion section 4.

The initial acceleration controller 5 includes the induced voltage determination section 51, a decoder 52, and a sequencer 53. The induced voltage determination section 51 determines the polarities of the induced voltages of the U- and V- and W-phases of the motor (MT) 1, which are generated by the induced voltage detector 3 and the A/D conversion section 4, and judges whether the induced voltages are higher or lower than a predetermined reference value $V_{TH}$. The output of the induced voltage determination section 51 generates an output signal Dmode indicative of the pull-up and pull-down conducting phases of the U-, V-, and W-phases of the motor (MT) 1.

The decoder 52 in the initial acceleration controller 5 decodes the output signal Dmode, which is generated from the output of the induced voltage determination section 51, to generate initial acceleration output signals UPON, UNON, VPON, VNON, WPON, WNON specifying the pull-up and pull-down conducting phases of the U-, V-, and W-phases of the motor (MT) 1.

In response to a start signal Start for starting the rotation of the three-phase motor (MT) 1, which is supplied from the parameter setup register 7A, the sequencer 53 in the initial acceleration controller 5 supplies a sense signal SENSE, which instructs the induced voltage detector 3 to detect three-phase induced voltages, to the induced voltage determination section 51. Further, in response to the output signal Dmode, which is generated from the output of the induced voltage determination section 51, the sequencer 53 supplies to the induced voltage determination section 51 an initial acceleration conduction mode signal Smode indicative of a total of six conduction states, namely, the conduction states of the pull-up and pull-down conducting phases of the U-, V-, and W-phases of the motor (MT) 1.

In the motor drive control device studied by the inventors of the present invention before its disclosure, which is shown in FIG. 13, the conduction start phase is determined by identifying an initial rotor position in accordance with the polarities of three-phase induced voltages, which are determined by the induced voltage detector 3, for initial acceleration of the three-phase motor (MT) 1, as described in Japanese Unexamined Patent Publications No. 2006-115599 and 2008-113506. The determined conduction start phase is indicated by the output signal Dmode indicative of a conducting phase, which is generated from the output terminal of the induced voltage determination section 51. In accordance with the result of determination of the conduction start phase, therefore, the motor drive control device shown in FIG. 13 begins to conduct (for motor drive) and PWM-drive the three-phase motor (MT) 1.

While the three-phase motor (MT) 1 is PWM-driven by the motor drive control device shown in FIG. 13, the induced voltage developed in a non-conducting phase is detected as described in Japanese Unexamined Patent Publications No. 2006-115599 and 2008-113506. Further, the peak of the induced voltage is detected to change the conducting phase. Even after such a conducting phase change, the peak of the induced voltage developed in a non-conducting phase during motor drive is continuously detected. The detected peak is then used to time a phase change for the purpose of accelerating the motor.

However, as mentioned earlier, the inventors engaged in the development have found that when the motor startup method adopted by the motor drive control device shown in FIG. 13 is used, it is difficult to properly start up various types of motors under operating conditions where motor operations are performed in a wide range of temperature and power supply voltage.

FIGS. 14A and 14B are diagrams illustrating the dependence of an induced voltage developed in a non-conducting phase during PWM drive provided by the motor drive control device studied by the inventors of the present invention before its disclosure, which is shown in FIG. 13, on a drive current or on the duty of a PWM drive signal. The drive current and the duty of the PWM drive signal, which are shown in FIGS. 14A and 14B, respectively, are the drive current prevailing during PWM drive and the ratio of a high-level period of the PWM drive signal, respectively.

The vertical axis of FIG. 14A represents an induced voltage that is developed in a non-conducting phase during PWM drive while the duty of the PWM drive signal is placed under predetermined conditions. The horizontal axis of FIG. 14A represents a drive current prevailing during PWM drive. As is obvious from FIG. 14A, the induced voltage increases in proportion to an increase in the drive current while the duty of the PWM drive signal is placed under predetermined conditions.

The vertical axis of FIG. 14B represents an induced voltage that is developed in a non-conducting phase during PWM drive while the drive current prevailing during PWM drive is placed under predetermined conditions. The horizontal axis of FIG. 14B represents the duty of the PWM drive signal. As is obvious from FIG. 14B, the induced voltage decreases in inverse proportion to an increase in the duty of the PWM drive signal (the ratio of a high-level period of the PWM drive signal).

When, in the motor drive control device shown in FIG. 13, conduction begins after the initial rotor position is identified in accordance with the determined polarities of three-phase induced voltages for initial acceleration, the drive current $I_{SENSE}$ prevailing during PWM drive decreases due, for instance, to an increase in the on-resistance of the power MOSFETs M1-M6 of the output driver 8, which is caused by an abnormal decrease in a power supply voltage Vspn for the output driver 8 and a temperature rise, and to the parasitic resistance provided by high resistance values of the stator coils LU, LV, LW of the motor (MT) 1.

Further, in the motor drive control device shown in FIG. 13, the motor (MT) 1 begins to rotate upon conduction (motor drive) for initial acceleration so that reverse voltages B-emf are developed across two-phase stator coils that are in conduction. As a result, the drive current $I_{SENSE}$ presently prevailing during PWM drive is calculated by subtracting the voltage difference between the reverse voltages B-emf of the conducting two-phase stator coils from the power supply voltage Vspn of the output driver 8 and dividing the resulting voltage by the sum of the on-resistances of the power MOSFETs M1-M6 of the output driver 8 and the parasitic resistances of the stator coils LU, LV, LW of the motor (MT) 1. As the voltage difference between the reverse voltages B-emf of the conducting two-phase stator coils increases when the motor (MT) 1 accelerates, the drive current $I_{SENSE}$ prevailing during PWM drive for initial acceleration decreases.

For reasons described above, in the motor drive control device shown in FIG. 13, the drive current $I_{SENSE}$ prevailing during PWM drive which is provided at the beginning of conduction for initial acceleration is smaller than the current instruction value of the parameter setup register 7A. Accordingly, as the motor drive current $I_{SENSE}$ detected by the current detector 9A is smaller than the current instruction value of the parameter setup register 7A, the VDRV signal at the output of the drive voltage generator 6C increases. This will increase the duty of the PWM signal at the output of the PWM modulator 6B, thereby increasing the motor drive current.

However, when the duty of the PWM drive signal increases, the induced voltage decreases in inverse proportion to an increase in the duty of the PWM drive signal as shown in FIG. 14B. Therefore, in the motor drive control device studied by the inventors of the present invention before its disclosure, which is shown in FIG. 13, it is difficult for the induced voltage determination section 51 to determine the polarities of the induced voltages developed in the U-, V-, and W-phases of the motor (MT) 1 and judge whether the induced voltages are higher or lower than the predetermined reference value $V_{TH}$. Consequently, the studies conducted by the inventors of the present invention before its disclosure have revealed that the output of the induced voltage determination section 51 does not generate the output signal Dmode, which indicates the pull-up and pull-down conducting phases of the U-, V-, and W-phases of the motor (MT) 1, thereby making it difficult to properly start up the motor (MT) 1. Particularly, the parasitic resistances of the stator coils LU, LV, LW may be high depending on the type of the motor (MT) 1, which is a three-phase DC motor. Therefore, even when the stator coils LU, LV, LW of the motor (MT) 1 have a high parasitic resistance, it is necessary to properly start up the motor (MT) 1.

The present invention has been made as a result of the above studies conducted, for instance, by the inventors of the present invention before its disclosure.

The present invention has been made in view of the above circumstances to properly start up various types of motors under operating conditions where motor operations are performed in a wide range of temperature and power supply voltage.

The foregoing and other advantages and novel features of the present invention will become apparent from the following description of the present invention and from the accompanying drawings.

A representative aspect of the present invention disclosed in this document is outlined below.

According to the representative aspect of the present invention, there is provided a motor drive control device including a voltage detector (3), an A/D conversion section (4), an initial acceleration controller (5), output drive controllers (6A, 6B, 6C), an output driver (8), and a current detector (9A).

The output driver (8) includes a plurality of power transistors (M1-M6) and an output pre-driver (81). The power transistors (M1-M6) drive a multiphase DC motor (1). The output pre-driver (81) drives a plurality of input electrodes of the power transistors.

The current detector (9A) is capable of detecting a motor drive current ($I_{SENSE}$) that flows to the multiphase DC motor (1).

Detected information about the motor drive current, which is detected by the current detector (9A), is converted to a current detection digital signal (ADCOUT) by the A/D conversion section (4).

The output drive controllers (6A, 6B, 6C) supply PWM drive output signals (UPWM, VPWM, WPWM) for PWM drive to the output pre-driver (81) in such a manner as to minimize the error between a current instruction signal and the current detection digital signal (ADCOUT).

The voltage detector (3) is capable of detecting an induced voltage developed across a stator coil (LU, LV, LW) of each phase of the multiphase DC motor (1) and generating a detected induced voltage (VMOUT).

When the multiphase DC motor (1) starts up, control is exercised to place the initial acceleration controller (5) in an operating state. In response to the detected induced voltage (VMOUT) generated from the voltage detector (3), the initial acceleration controller (5) supplies a plurality of initial acceleration output signals (UPON, UNON, VPON, VNON, WPON, WNON) specifying a conducting phase for initial acceleration of the multiphase DC motor (1) to the output drive controllers (6A, 6B, 6C).

The initial acceleration controller (5), the output drive controllers (6A, 6B, 6C), and the output driver (8) change the conducting phase and perform the PWM drive to provide the initial acceleration of the multiphase DC motor (1) in response to the detected induced voltage (VMOUT) and to the error upon startup of the multiphase DC motor (1).

Upper-limit duty values for the PWM drive output signals (UPWM, VPWM, WPWM) to be supplied from the output drive controllers (6A, 6B, 6C) to the output pre-driver (81) during the period of the initial acceleration can be arbitrarily set in the output drive controllers (6A, 6B, 6C) (see FIG. 1).

An advantage provided by a representative aspect of the present invention is outlined below.

The present invention makes it possible to properly start up various types of motors under operating conditions where motor operations are performed in a wide range of temperature and power supply voltage.

BRIEF DESCRIPTION OF THE DRAWINGS

Embodiments of the present invention will be described in detail based on the following figures, in which.

DETAILED DESCRIPTION

1. Overview of Embodiments

Figure 1:
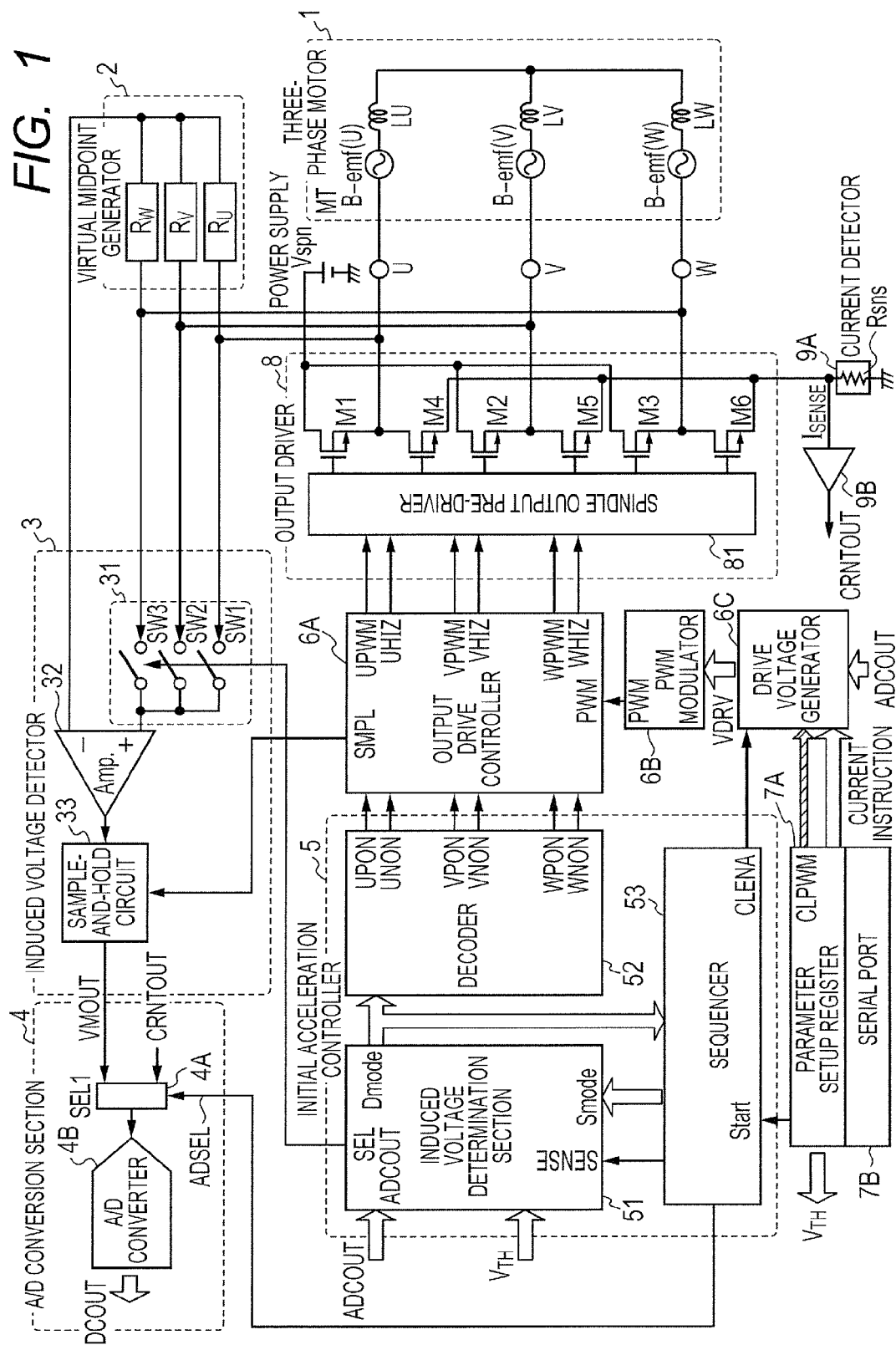
FIG. 1 is a diagram illustrating the configuration of a motor drive control device for driving a three-phase DC motor in accordance with a first embodiment of the present invention.

First of all, embodiments representative of the present invention disclosed in this document will be summarized. The parenthesized reference numerals in the accompanying drawings referred to in the overview of the representative embodiments merely illustrate what is contained in the concept of elements to which the reference numerals are affixed.

[1] According to a representative aspect of the present invention, there is provided a motor drive control device including a voltage detector (3), an A/D conversion section (4), an initial acceleration controller (5), output drive controllers (6A, 6B, 6C), an output driver (8), and a current detector (9A).

The output driver (8) includes a plurality of power transistors (M1-M6) and an output pre-driver (81). The power transistors (M1-M6) drive a multiphase DC motor (1). The output pre-driver (81) drives a plurality of input electrodes of the power transistors.

The current detector (9A) is capable of detecting a motor drive current ($I_{SENSE}$) that flows to the multiphase DC motor (1).

Detected information about the motor drive current, which is detected by the current detector (9A), is converted to a current detection digital signal (ADCOUT) by the A/D conversion section (4).

The output drive controllers (6A, 6B, 6C) supply PWM drive output signals (UPWM, VPWM, WPWM) for PWM drive to the output pre-driver (81) in such a manner as to minimize the error between a current instruction signal and the current detection digital signal (ADCOUT).

The voltage detector (3) is capable of detecting the induced voltage developed across the stator coil (LU, LV, LW) of each phase of the multiphase DC motor (1) and generating a detected induced voltage (VMOUT).

When the multiphase DC motor (1) starts up, control is exercised to place the initial acceleration controller (5) in an operating state. In response to the detected induced voltage (VMOUT) generated from the voltage detector (3), the initial acceleration controller (5) supplies a plurality of initial acceleration output signals (UPON, UNON, VPON, VNON, WPON, WNON) specifying a conducting phase for initial acceleration of the multiphase DC motor (1) to the output drive controllers (6A, 6B, 6C).

The initial acceleration controller (5), the output drive controllers (6A, 6B, 6C), and the output driver (8) change the conducting phase and perform the PWM drive to provide the initial acceleration of the multiphase DC motor (1) in response to the detected induced voltage (VMOUT) and to the error upon startup of the multiphase DC motor (1).

Upper-limit duty values for the PWM drive output signals (UPWM, VPWM, WPWM) to be supplied from the output drive controllers (6A, 6B, 6C) to the output pre-driver (81) during the period of the initial acceleration can be arbitrarily set in the output drive controllers (6A, 6B, 6C) (see FIG. 1).

According to the above aspect of the present invention, various types of motors can be properly started up under operating conditions where motor operations are performed in a wide range of temperature and power supply voltage.

In a preferred aspect of the present invention, the detected induced voltage (VMOUT), which is generated from the voltage detector (3), is converted to an induced voltage detection digital signal (ADCOUT) by the A/D conversion section (4).

Figure 6:
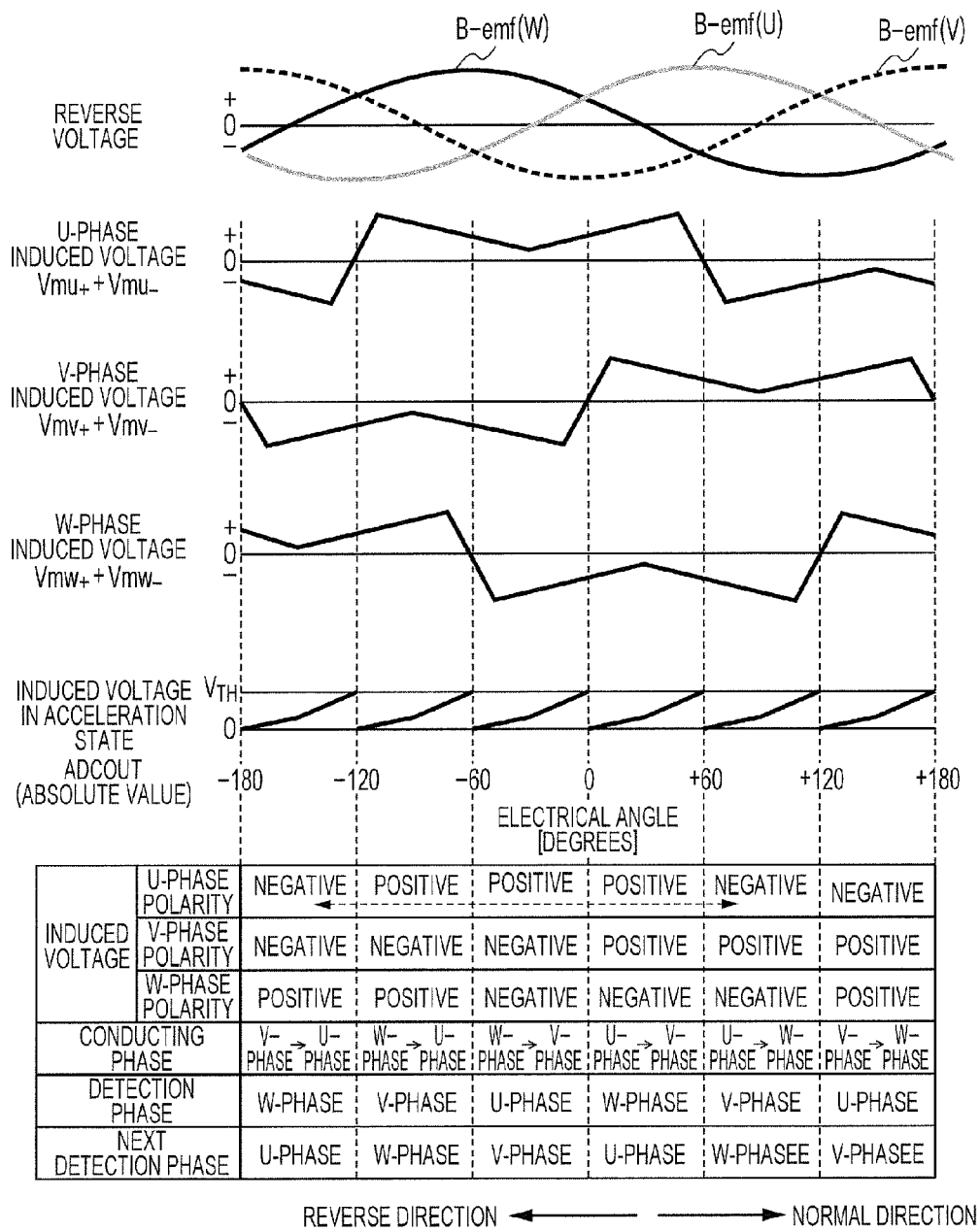
FIG. 6 is a diagram that relates to the motor drive control device according to the first embodiment, which is shown in FIGS. 1 and 5, and illustrates the waveforms of reverse voltages B-emf(U), B-emf(V), B-emf(W) of three-phase stator coils LU, LV, LW of the motor (MT) 1, three-phase added induced voltages (Vmu+)+(Vmu−), (Vmv+)+(Vmv−), (Vmw+)+(Vmw−), and an absolute value output ADCOUT of an absolute value circuit 514.

Before the initial acceleration, the initial acceleration controller (5) can identify the position of a rotor of the multiphase DC motor (1) from a combination of pieces of polarity information carried by the induced voltage detection digital signal (ADCOUT) concerning the phases of the multiphase DC motor (1) (see FIG. 6).

In another preferred aspect of the present invention, the initial acceleration controller (5) determines a first conducting phase for the initial acceleration in accordance with the rotor position identified before the initial acceleration (see FIG. 6).

In still another preferred aspect of the present invention, the initial acceleration controller (5) makes the conducting phase change when the induced voltage detection digital signal (ADCOUT) reaches a predetermined reference value ($V_{TH}$) after the energization of the first conducting phase for the initial acceleration (see FIG. 6).

In a more preferred aspect of the present invention, the motor drive control device further includes input circuits (7A, 7B) capable of receiving a control signal from the outside of the motor drive control device.

A duty control signal (CLPWM), which is used to arbitrarily set the upper-limit duty values for the PWM drive output signals (UPWM, VPWM, WPWM) to be supplied from the output drive controllers (6A, 6B, 6C) to the output pre-driver (81) during the period of the initial acceleration, can be supplied from the outside of the motor drive control device to the output drive controllers (6A, 6B, 6C) through the input circuits (7A, 7B) (see FIG. 1).

In another more preferred aspect of the present invention, the initial acceleration controller (5) generates a clamp enable signal (CLENA) during the period of the initial acceleration in response to a start signal (Start) for starting the rotation of the multiphase DC motor (1), which is supplied from the input circuits (7A, 7B).

Figure 7:
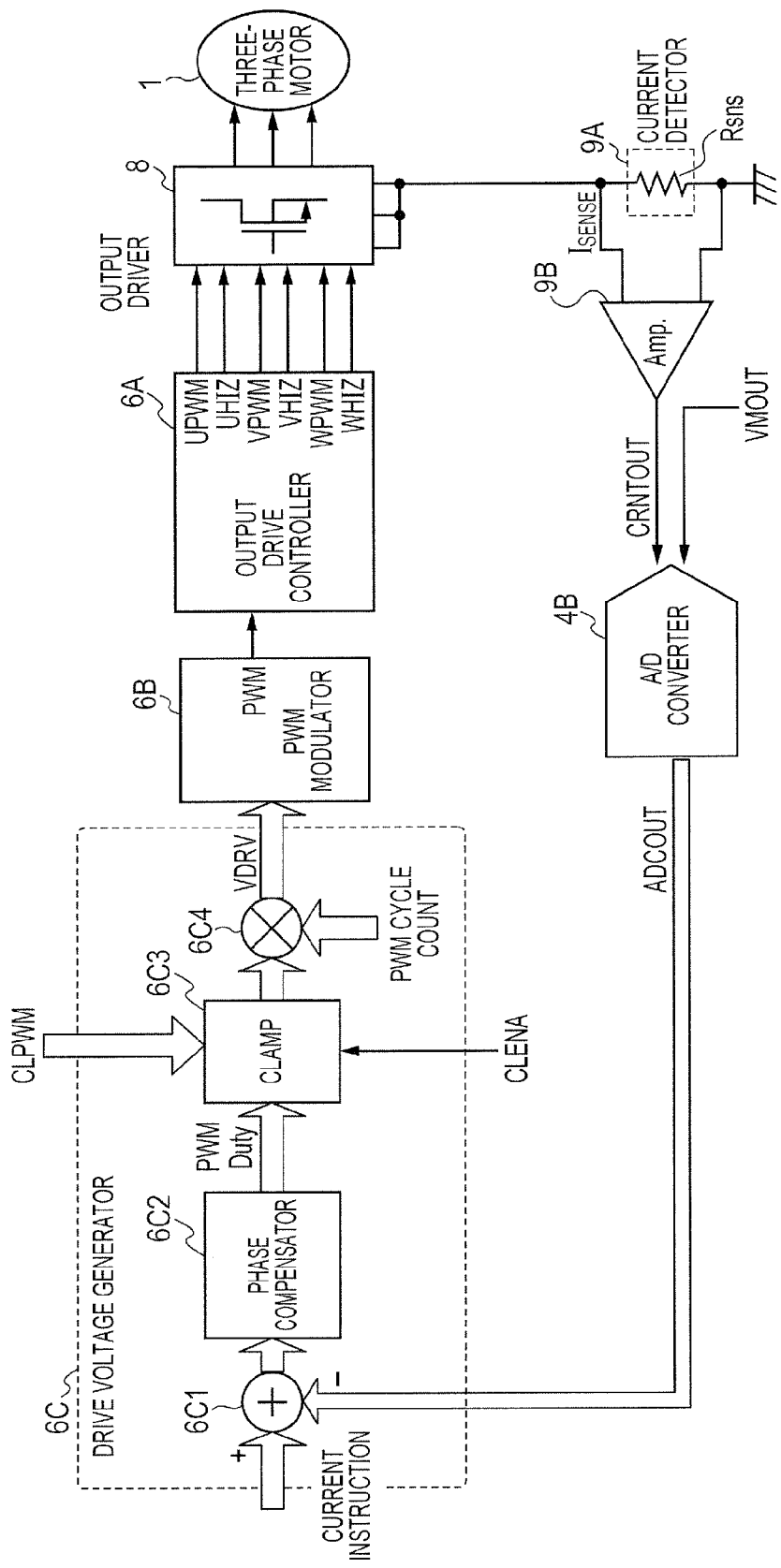
FIG. 7 is a diagram illustrating the configuration of a drive voltage generator 6C in the motor drive control device according to the first embodiment, which is shown in FIG. 1.

During the period of the initial acceleration, in response to the clamp enable signal (CLENA) generated from the initial acceleration controller (5), the output drive controllers (6A, 6B, 6C) set the upper-limit duty values for the PWM drive output signals (UPWM, VPWM, WPWM), which are to be supplied to the output pre-driver (81), in accordance with the duty control signal (CLPWM) (see FIGS. 1 and 7).

In still another more preferred aspect of the present invention, the initial acceleration controller (5) detects that the induced voltage detection digital signal (ADCOUT) has not reached the predetermined reference value ($V_{TH}$) at a predetermined timing, and then generates a detection signal (COM), which indicates that the predetermined reference value ($V_{TH}$) is not reached.

In response to the detection signal (COM), which indicates that the predetermined reference value ($V_{TH}$) is not reached, the initial acceleration controller (5) generates a low-level sub-reference value ($V_{THSUB}$) that is lower than the predetermined reference value ($V_{TH}$).

Figure 11:
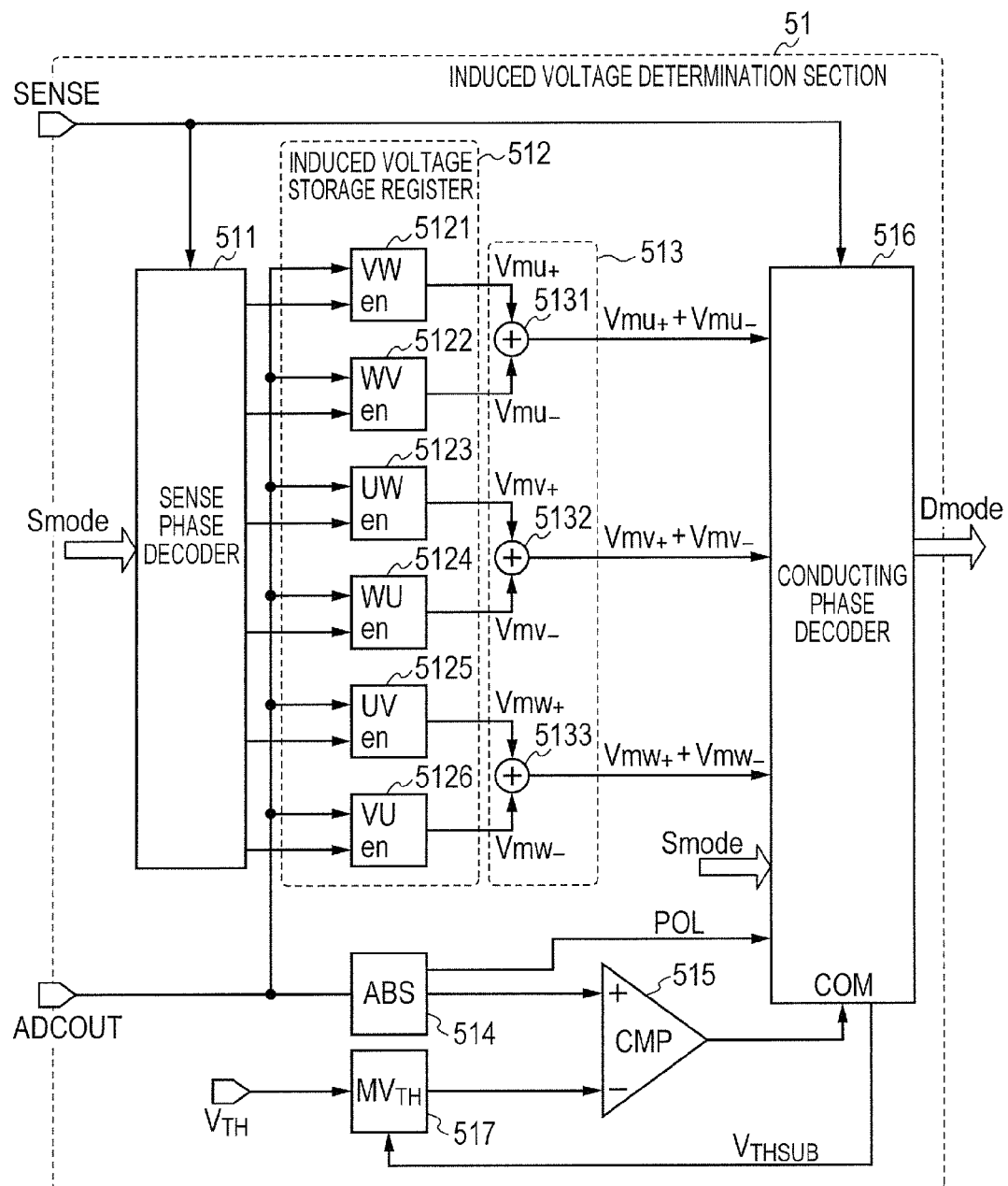
FIG. 11 is a diagram illustrating the configuration of the induced voltage determination section 51 in the initial acceleration controller 5 of the motor drive control device according to a second embodiment of the present invention.
Figure 12:
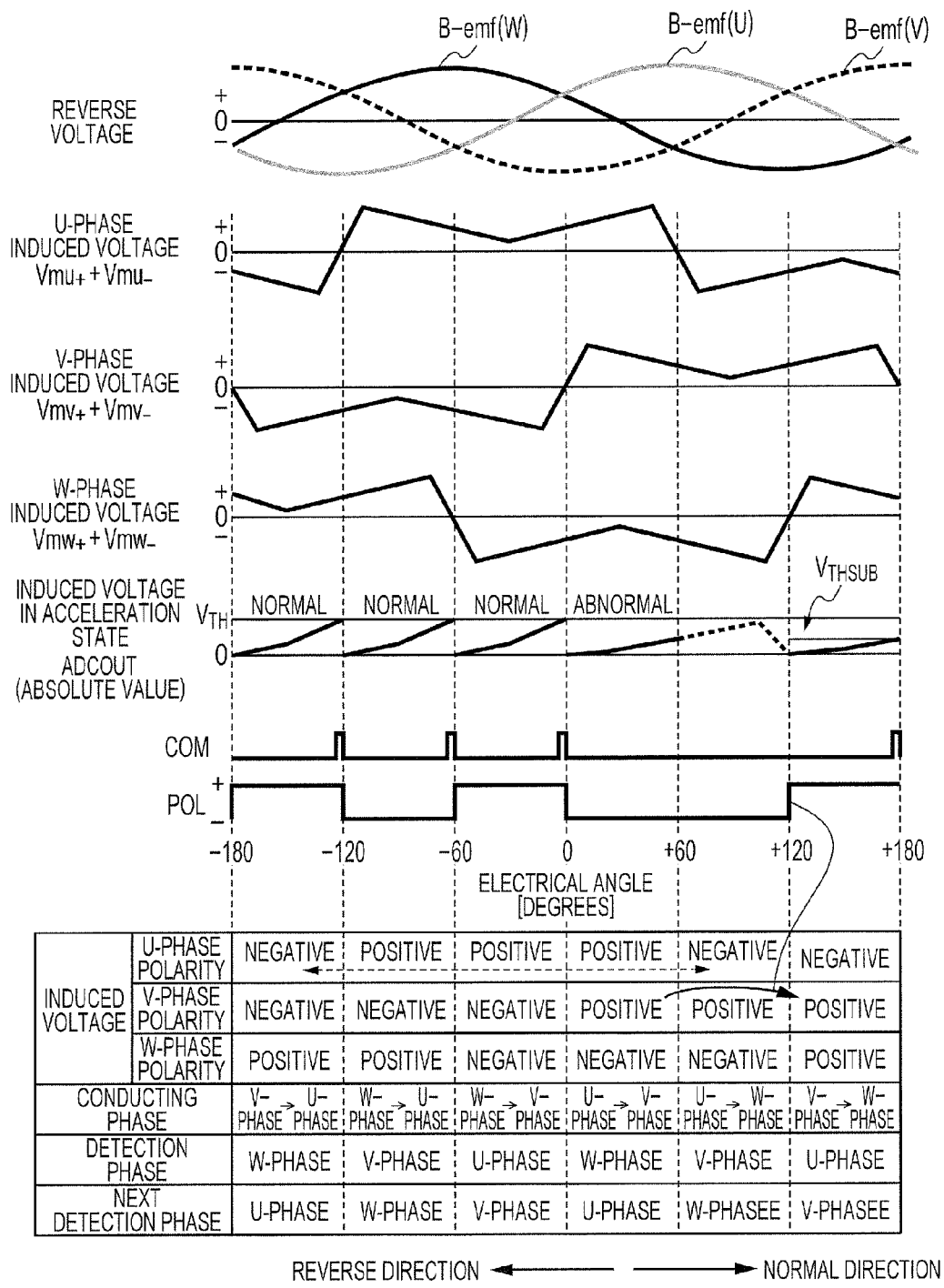
FIG. 12 is a diagram that relates to the motor drive control device including the induced voltage determination section 51 according to the second embodiment, which is shown in FIG. 11, and illustrates the waveforms of the reverse voltages of three-phase stator coils LU, LV, LW of the motor (MT) 1, the waveforms of the three-phase added induced voltages, the waveform of the absolute value output ADCOUT of the absolute value circuit 514, the waveform of a comparator output signal COM, and the waveform of a polarity determination signal POL.

When the induced voltage detection digital signal (ADCOUT) reaches the low-level sub-reference value ($V_{THSUB}$), the initial acceleration controller (5) makes the conducting phase change (see FIGS. 11 and 12).

In yet another more preferred aspect of the present invention, the predetermined reference value ($V_{TH}$) can be supplied from the outside of the motor drive control device to the initial acceleration controller (5) through the input circuits (7A, 7B) (see FIG. 1).

In a detailed aspect of the present invention, the voltage detector (3), the A/D conversion section (4), the initial acceleration controller (5), the output drive controllers (6A, 6B, 6C), and the output driver (8) are integrated in a semiconductor chip having a semiconductor integrated circuit (see FIG. 1).

In the most detailed aspect of the present invention, the voltage detector (3), the A/D conversion section (4), the initial acceleration controller (5), the output drive controllers (6A, 6B, 6C), and the output driver (8), which are integrated in the semiconductor chip having the semiconductor integrated circuit, are capable of driving the multiphase DC motor (1), which is a three-phase DC motor serving as a spindle motor for rotating a magnetic disk in a hard disk drive (see FIG. 1).

[2] According to another representative aspect of the present invention, there is provided a method of operating a motor drive control device that includes a voltage detector (3), an A/D conversion section (4), an initial acceleration controller (5), output drive controllers (6A, 6B, 6C), an output driver (8), and a current detector (9A).

The output driver (8) includes a plurality of power transistors (M1-M6) and an output pre-driver (81). The power transistors (M1-M6) drive a multiphase DC motor (1). The output pre-driver (81) drives a plurality of input electrodes of the power transistors.

The current detector (9A) is capable of detecting a motor drive current ($I_{SENSE}$) that flows to the multiphase DC motor (1).

Detected information about the motor drive current, which is detected by the current detector (9A), is converted to a current detection digital signal (ADCOUT) by the A/D conversion section (4).

The output drive controllers (6A, 6B, 6C) supply PWM drive output signals (UPWM, VPWM, WPWM) for PWM drive to the output pre-driver (81) in such a manner as to minimize the error between a current instruction signal and the current detection digital signal (ADCOUT).

The voltage detector (3) is capable of detecting the induced voltage developed across the stator coil (LU, LV, LW) of each phase of the multiphase DC motor (1) and generating a detected induced voltage (VMOUT).

When the multiphase DC motor (1) starts up, control is exercised to place the initial acceleration controller (5) in an operating state. In response to the detected induced voltage (VMOUT) generated from the voltage detector (3), the initial acceleration controller (5) supplies a plurality of initial acceleration output signals (UPON, UNON, VPON, VNON, WPON, WNON) specifying a conducting phase for initial acceleration of the multiphase DC motor (1) to the output drive controllers (6A, 6B, 6C).

The initial acceleration controller (5), the output drive controllers (6A, 6B, 6C), and the output driver (8) change the conducting phase and perform the PWM drive to provide the initial acceleration of the multiphase DC motor (1) in response to the detected induced voltage (VMOUT) and to the error upon startup of the multiphase DC motor (1).

Upper-limit duty values for the PWM drive output signals (UPWM, VPWM, WPWM) to be supplied from the output drive controllers (6A, 6B, 6C) to the output pre-driver (81) during the period of the initial acceleration can be arbitrarily set in the output drive controllers (6A, 6B, 6C) (see FIG. 1).

According to the above-described aspects of the present invention, various types of motors can be properly started up under operating conditions where motor operations are performed in a wide range of temperature and power supply voltage.

2. Details of Embodiments

Embodiments of the present invention will now be described in further detail. Throughout the drawings for illustrating the best embodiments for implementing the present invention, parts having the same functions are designated by the same reference numerals and will not be redundantly described.

First Embodiment

<Essential Configuration of Motor Drive Control Device>

FIG. 1 is a diagram illustrating the configuration of a motor drive control device for driving a three-phase DC motor in accordance with a first embodiment of the present invention.

Figure 13:
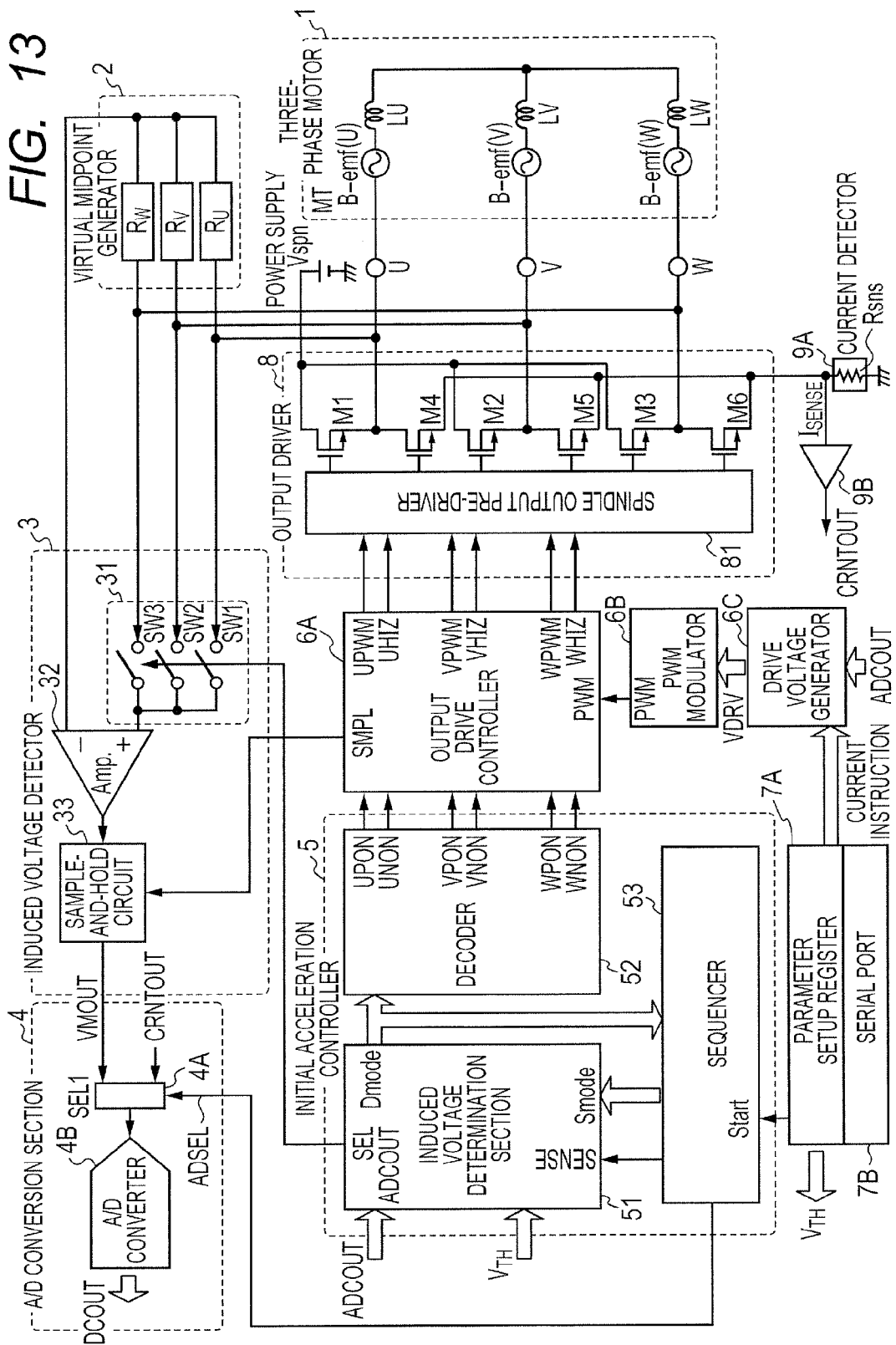
FIG. 13 is a diagram illustrating the configuration of a motor drive control device for driving a three-phase DC motor, which has been studied by the inventors of the present invention before its disclosure.

Essential differences between the motor drive control device according to the first embodiment of the present invention, which is shown in FIG. 1, and the motor drive control device studied by the inventors of the present invention before its disclosure, which is shown in FIG. 13, are described below.

In the motor drive control device according to the first embodiment, which is shown in FIG. 1, the sequencer 53 in the initial acceleration controller 5 supplies a clamp enable signal CLENA to a drive voltage generator 6C, and a parameter setup register 7A supplies a PWM duty upper-limit clamp signal CLPWM to the drive voltage generator 6C.

The clamp enable signal CLENA makes it possible to clamp an increase in the duties of PWM drive control signals UPWM, VPWM, WPWM, which are generated from an output drive controller 6A when conduction starts for initial acceleration after an initial rotor position is identified by an induced voltage detector 3. The PWM duty upper-limit clamp signal CLPWM sets a PWM duty upper-limit value for a duty clamp operation on the PWM drive control signals UPWM, VPWM, WPWM, which is enabled by the clamp enable signal CLENA. This upper-limit setting to be specified by the PWM duty upper-limit clamp signal CLPWM can be arbitrarily defined from an external microcontroller or central processing unit (CPU) through a serial port 7B. Further, the clamp enable signal CLENA is kept at a high level by the sequencer 53 in the initial acceleration controller 5 during a delay time, which corresponds to an initial acceleration period subsequent to a low-to-high level change in a later-described start signal Start. At the end of the delay time, which corresponds to the initial acceleration period, the sequencer 53 in the initial acceleration controller 5 changes the level of the clamp enable signal CLENA from high to low.

It is therefore assumed that a high-level clamp enable signal CLENA is supplied from the sequencer 53 in the initial acceleration controller 5 to the drive voltage generator 6C, and that a PWM duty upper-limit clamp signal CLPWM indicating a PWM duty upper-limit value, for instance, of 80% is supplied from the parameter setup register 7A to the drive voltage generator 6C. The error between a current detection digital signal at the output ADCOUT of an A/D converter 4B and a current instruction value supplied from the parameter setup register 7A is calculated by the drive voltage generator 6C. A drive voltage VDRV equivalent to 80% of the maximum value of this error is supplied from the output of the drive voltage generator 6C to the input of a PWM modulator 6B. In response to the drive voltage VDRV equivalent to 80% of the maximum error, the PWM modulator 6B supplies a PWM signal whose maximum voltage amplitude is limited to 80% to the input of the output drive controller 6A. Therefore, the upper limit on an increase in the duties of the PWM drive control signals UPWM, VPWM, WPWM generated from the output drive controller 6A is clamped at 80% as specified by the PWM duty upper-limit clamp signal CLPWM.

Figure 14A:
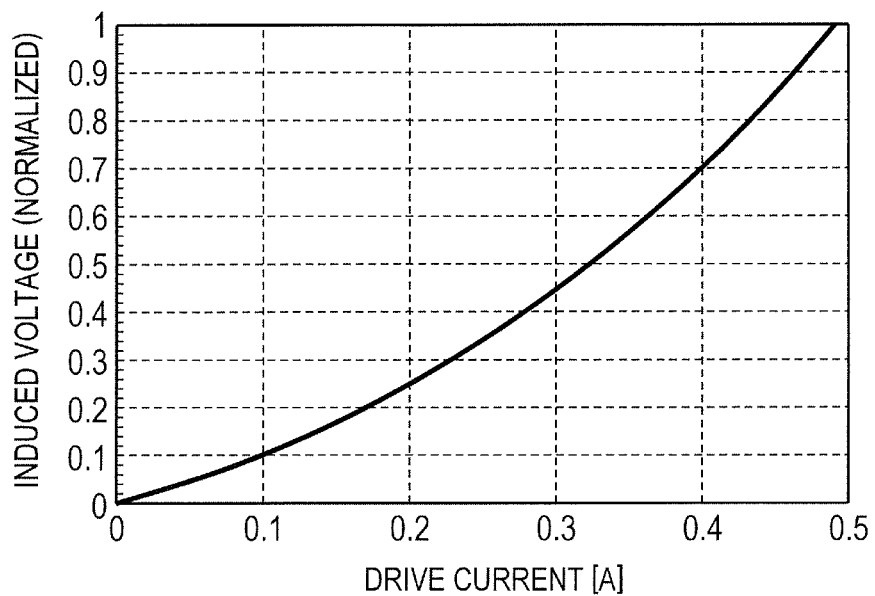
FIGS. 14A and 14B are diagrams illustrating the dependence of an induced voltage developed in a non-conducting phase during PWM drive provided by the motor drive control device studied by the inventors of the present invention before its disclosure, which is shown in FIG. 13, on a drive current or on the duty of a PWM drive signal.
Figure 14B:
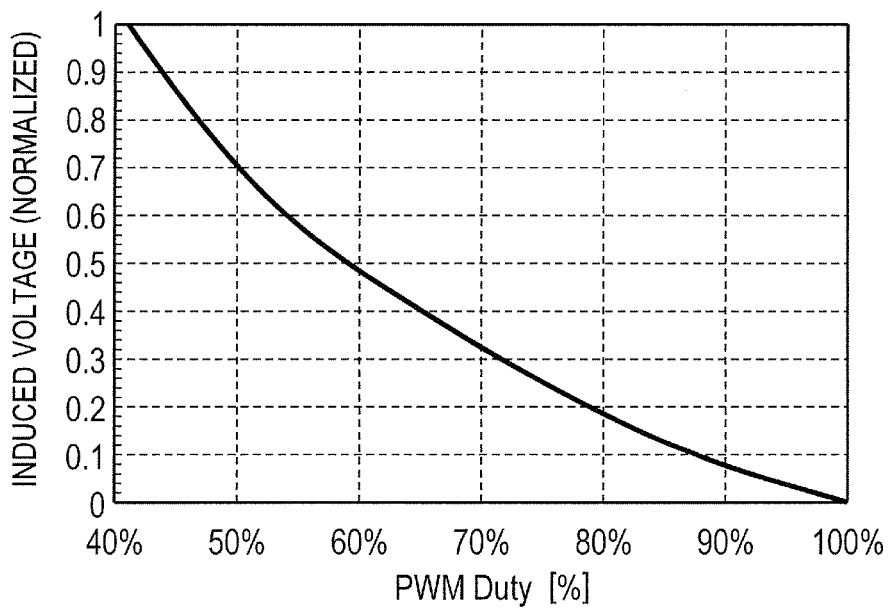

Consequently, the motor drive control device according to the first embodiment, which is shown in FIG. 1, also clamps a decrease in the induced voltage because an increase in the duty of a PWM drive signal shown in FIG. 14B is clamped at 80% as specified by the PWM duty upper-limit clamp signal CLPWM.

As a result, even when the PWM drive current $I_{SENSE}$ prevailing during initial acceleration is smaller than the current instruction value supplied from the parameter setup register 7A due, for instance, to high parasitic resistances of stator coils LU, LV, LW of a motor (MT) 1, an induced voltage determination section 51 can determine the polarities of induced voltages in the U-, V-, and W-phases of the motor (MT) 1 and judge whether the induced voltages are higher or lower than the predetermined reference value $V_{TH}$. Therefore, the output of the induced voltage determination section 51 generates an output signal Dmode, which indicates the pull-up and pull-down conducting phases of the U-, V-, and W-phases of the motor (MT) 1. This makes it possible to properly start up the motor (MT) 1.

The configuration of the motor drive control device according to the first embodiment, which is shown in FIG. 1, will now be described in detail.

<Detailed Configuration of Motor Drive Control Device>

As shown in FIG. 1, voltage sources, which equivalently exhibit reverse voltages B-emf (U), B-emf (V), B-emf (W), are coupled to one ends of stator coils of the motor (MT) 1, namely, a U-phase stator coil LU, a V-phase stator coil LV, and a W-phase stator coil LW. The other ends of the U-phase stator coil LU, V-phase stator coil LV, and W-phase stator coil LW of the motor (MT) 1 are commonly coupled as a midpoint.

The motor drive control device shown in FIG. 1 includes a virtual midpoint generator 2, an induced voltage detector 3, an A/D conversion section 4, an initial acceleration controller 5, an output drive controller 6A, a PWM modulator 6B, a drive voltage generator 6C, a parameter setup register 7A, a serial port 7B, an output driver 8, a current detector 9A, and a sense amplifier 9B.

In the motor drive control device shown in FIG. 1, components other than the current detector 9A, namely, the virtual midpoint generator 2, the induced voltage detector 3, the A/D conversion section 4, the initial acceleration controller 5, the output drive controller 6A, the PWM modulator 6B, the drive voltage generator 6C, the parameter setup register 7A, the serial port 7B, the output driver 8, and the sense amplifier 9B, are integrated in a semiconductor chip having a semiconductor integrated circuit called a motor driver IC. The motor drive control device, which is shown in FIG. 1 and formed by the semiconductor integrated circuit called the motor driver IC, drives a three-phase motor (MT) 1, which is a three-phase DC motor serving as a spindle motor for rotating a magnetic disk in a hard disk drive (HDD).

<Output Driver>

The stator coils LU, LV, LW of the three-phase motor (MT) 1 are PWM-driven by the output driver 8. The output driver 8 includes a spindle output pre-driver 81, pull-up power MOSFETs M1, M2, M3, and pull-down power MOSFETs M4, M5, M6. The U-phase stator coil LU of the motor (MT) 1 is driven by the pull-up power MOSFET M1 and pull-down power MOSFET M4. The V-phase stator coil LV of the motor (MT) 1 is driven by the pull-up power MOSFET M2 and pull-down power MOSFET M5. The W-phase stator coil LW of the motor (MT) 1 is driven by the pull-up power MOSFET M3 and pull-down power MOSFET M6. The spindle output pre-driver 81 is driven by output control signals UPWM, UHIZ, VPWM, VHIZ, WPWM, WHIZ, which are generated from the output drive controller 6A.

<Current Detector and Sense Amplifier>

A motor drive current for the three-phase motor (MT) 1 is detected by using the current detector 9A, which is formed by a DC shunt resistor Rsns. One end of the DC shunt resistor Rsns is coupled to a common source of the three pull-down power MOSFETs M4, M5, M6 of the output driver 8 while the other end of the DC shunt resistor Rsns is coupled to a ground voltage.

Therefore, the motor drive current $I_{SENSE}$, which flows to the common source of the three pull-down power MOSFETs M4, M5, M6 of the output driver 8, is converted to a voltage by the DC shunt resistor Rsns of the current detector 9A. The voltage is amplified by the sense amplifier 9B. A current detection voltage CRNTOUT of the sense amplifier 9B is supplied to an A/D converter 4B through a selector 4A of the A/D conversion section 4.

<Drive Voltage Generator, PWM Modulator, and Output Drive Controller>

An error between a current detection digital signal at the output ADCOUT of the A/D converter 4B and a current instruction value supplied from the parameter setup register 7A is calculated by the drive voltage generator 6C, and a drive voltage VDRV corresponding to the error is supplied from the output of the drive voltage generator 6C to the input of the PWM modulator 6B. In response to the drive voltage VDRV, the PWM modulator 6B supplies a PWM signal to the input terminal of the output drive controller 6A. Hence, the output drive controller 6A generates the output control signals UPWM, UHIZ, VPWM, VHIZ, WPWM, WHIZ, which PWM-drive the power MOSFETs of the output driver 8. The current instruction value of the parameter setup register 7A can be set, for instance, from a microcontroller external to the motor drive control device shown in FIG. 13 through the serial port 7B. Further, the predetermined reference value $V_{TH}$, which is set in the induced voltage determination section 51 of the initial acceleration controller 5 from the parameter setup register 7A for a conducting phase change, can also be set in the parameter setup register 7A, for instance, from a microcontroller external to the motor drive control device shown in FIG. 1 through the serial port 7B.

Consequently, if the motor drive current $I_{SENSE}$ detected by the DC shunt resistor Rsns of the current detector 9A is smaller than the current instruction value of the parameter setup register 7A, the drive voltage generator 6C is controlled so as to increase the VDRV signal at the output of the drive voltage generator 6C. Hence, the duty of the PWM signal at the output of the PWM modulator 6B increases to increase the motor drive current. If, on the contrary, the motor drive current detected by the DC shunt resistor Rsns of the current detector 9A is greater than the current instruction value of the parameter setup register 7A, the drive voltage generator 6C is controlled so as to decrease the VDRV signal at the output of the drive voltage generator 6C. Hence, the duty of the PWM signal at the output of the PWM modulator 6B decreases to decrease the motor drive current. In other words, the difference between the motor drive current $I_{SENSE}$ detected by the current detector 9A and the current instruction value of the parameter setup register 7A is detected to adjust the duty of the PWM signal at the output of the PWM modulator 6B until the difference decreases to zero. The output drive controller 6A then generates a PWM drive control signal for driving the power MOSFETs of the output driver 8 to control the motor drive current $I_{SENSE}$.

<Virtual Midpoint Generator>

The virtual midpoint generator 2 includes three resistors $R_U$, $R_V$, $R_W$. One ends of the three resistors $R_U$, $R_V$, $R_W$ are coupled to one ends of the stator coils LU, LV, LW of the motor (MT) 1. When the resistance values of the three resistors $R_U$, $R_V$, $R_W$ of the virtual midpoint generator 2 are set to the same resistance R, the voltage at the other ends of the three resistors $R_U$, $R_V$, $R_W$ is a virtual midpoint voltage that is substantially equal to the midpoint potential of the other end to which the U-phase stator coil LU, V-phase stator coil LV, and W-phase stator coil LW of the motor (MT) 1 are commonly coupled.

<Induced Voltage Detector and A/D Conversion Section>

The induced voltage detector 3 includes a selector 31, an amplifier 32, and a sample-and-hold circuit 33. The selector 31 includes a first switch SW1, a second switch SW2, and a third switch SW3. One end of the first switch SW1 is coupled to one end of the U-phase stator coil LU of the motor (MT) 1 and to one end of the resistor $R_U$ of the virtual midpoint generator 2. One end of the second switch SW2 is coupled to one end of the V-phase stator coil LV of the motor (MT) 1 and to one end of the resistor $R_V$ of the virtual midpoint generator 2. One end of the third switch SW3 is coupled to one end of the W-phase stator coil LW of the motor (MT) 1 and to one end of the resistor $R_W$ of the virtual midpoint generator 2. The three other ends of the first, second, and third switches SW1, SW2, SW3 of the selector 31 are commonly coupled to a noninverting input terminal+ of the amplifier 32. The virtual midpoint voltage at the other end to which the three resistors $R_U$, $R_V$, $R_W$ of the virtual midpoint generator 2 are commonly coupled is supplied to an inverting input terminal—of the amplifier 32. A selection signal SEL generated from the induced voltage determination section 51 of the initial acceleration controller 5 provides on/off control of the first, second, and third switches SW1, SW2, SW3 of the selector 31. A signal output from the amplifier 32 of the induced voltage detector 3 is supplied to the input terminal of the sample-and-hold circuit 33. A detected induced voltage VMOUT, which is a sample-and-hold output signal at the output terminal of the sample-and-hold circuit 33, is supplied to the A/D converter 4B through the selector 4A of the A/D conversion section 4.

<Initial Acceleration Controller>

The initial acceleration controller 5 includes the induced voltage determination section 51, a decoder 52, and the sequencer 53. The induced voltage determination section 51 determines the polarities of the induced voltages in the U-, V-, and W-phases of the motor (MT) 1, which are generated by the induced voltage detector 3 and the A/D conversion section 4, and judges whether the induced voltages are higher or lower than the predetermined reference value $V_{TH}$. The output of the induced voltage determination section 51 generates the output signal Dmode, which indicates the pull-up and pull-down conducting phases of the U-, V-, and W-phases of the motor (MT) 1.

The decoder 52 in the initial acceleration controller 5 decodes the output signal Dmode, which is generated from the output of the induced voltage determination section 51, to generate initial acceleration output signals UPON, UNON, VPON, VNON, WPON, WNON specifying the pull-up and pull-down conducting phases of the U-, V-, and W-phases of the motor (MT) 1.

In response to a start signal Start for starting the rotation of the three-phase motor (MT) 1, which is supplied from the parameter setup register 7A, the sequencer 53 in the initial acceleration controller 5 supplies a sense signal SENSE, which instructs the induced voltage detector 3 to detect three-phase induced voltages, to the induced voltage determination section 51. Further, in response to the output signal Dmode, which is generated from the output of the induced voltage determination section 51, the sequencer 53 supplies to the induced voltage determination section 51 an initial acceleration conduction mode signal Smode indicative of a total of six conduction states, namely, the conduction states of the pull-up and pull-down conducting phases of the U-, V-, and W-phases of the motor (MT) 1.

In the motor drive control device according to the first embodiment, which is shown in FIG. 1, a conduction start phase is determined by identifying the initial rotor position for initial acceleration of the three-phase motor (MT) 1 in accordance with the polarities of three-phase induced voltages, which are determined by the induced voltage detector 3, as described in Japanese Unexamined Patent Publications No. 2006-115599 and 2008-113506. The determined conduction start phase is indicated by the output signal Dmode indicative of a conducting phase, which is generated from the output terminal of the induced voltage determination section 51. Therefore, in response to the result of determination of the conduction start phase, the motor drive control device according to the first embodiment, which is shown in FIG. 1, begins to conduct (for motor drive) and PWM-drive the three-phase motor (MT) 1.

While PWM drive is being provided by the motor drive control device according to the first embodiment, which is shown in FIG. 1, an induced voltage developed in a non-conducting phase is detected as described in Japanese Unexamined Patent Publication No. 2008-113506 to make a conducting phase change when the induced voltage exceeds the predetermined reference value $V_{TH}$. Further, even after such a conducting phase change, a timing at which an induced voltage developed in a non-conducting phase during motor drive exceeds the predetermined reference value $V_{TH}$ is continuously detected. The motor is then accelerated by using the detected timing as the timing for a phase change.

<Detection of Induced Voltage>

Figure 2A:
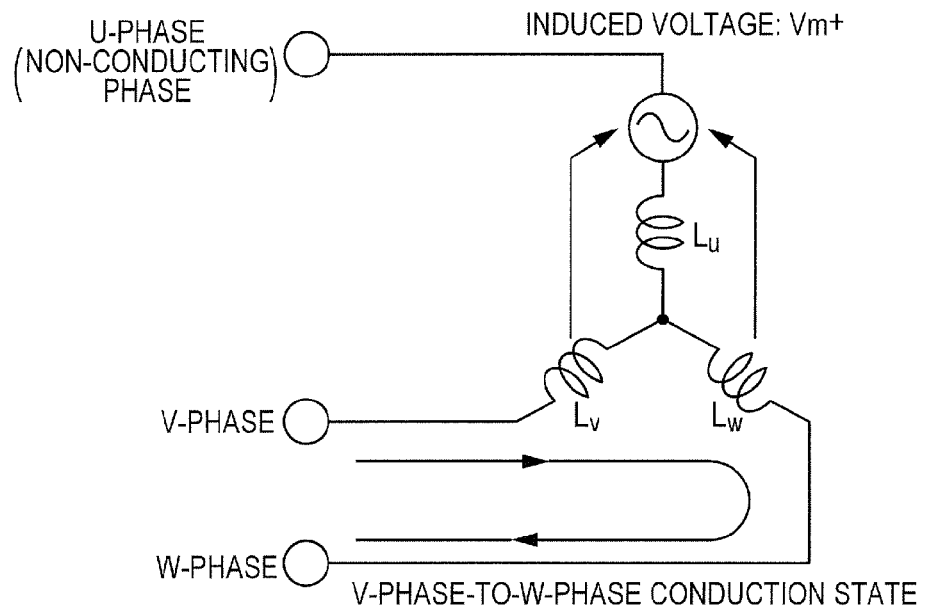
FIGS. 2A and 2B are diagrams illustrating how a short pulse current, to which a rotor does not respond, flows to field coils of two phases so that an induced voltage will be detected by an induced voltage detector 3, which identifies an initial rotor position of the three-phase motor (MT) 1 before its initial acceleration in the motor drive control device according to the first embodiment, which is shown in FIG. 1.
Figure 2B:
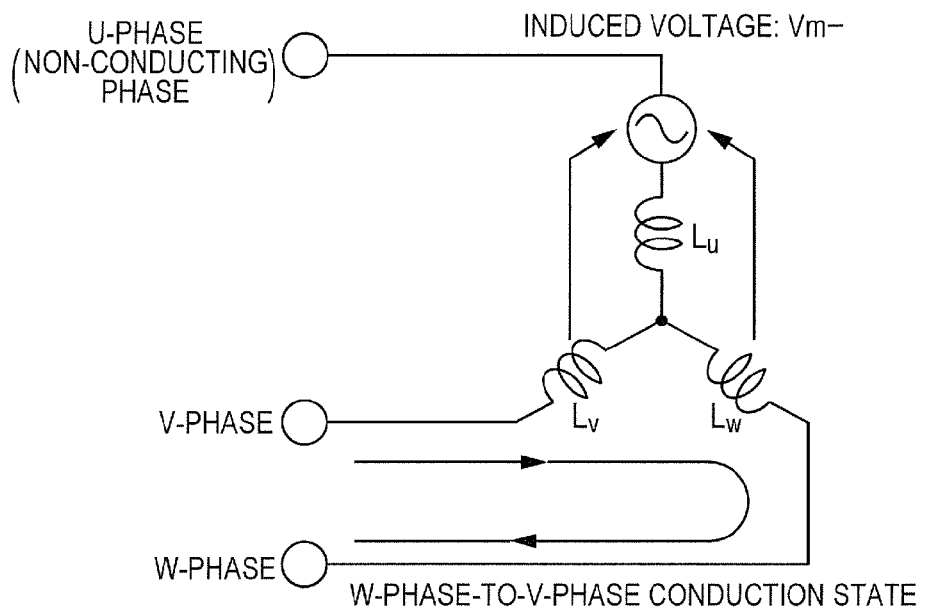

FIGS. 2A and 2B are diagrams illustrating how a short pulse current, to which a rotor does not respond, flows to field coils of two phases so that an induced voltage will be detected by the induced voltage detector 3, which identifies the initial rotor position of the three-phase motor (MT) 1 for its initial acceleration in the motor drive control device according to the first embodiment, which is shown in FIG. 1.

FIG. 2A is a diagram illustrating how an induced voltage Vm+, which is dependent on the positional relationship between a rotor's magnet and a stator's field coil, is developed in a non-conducting U-phase when a short pulse current flows in a forward direction from the V-phase of the motor (MT) 1 to the W-phase.

FIG. 2B is a diagram illustrating how an induced voltage Vm−, which is dependent on the positional relationship between the rotor's magnet and the stator's field coil, is generated in a non-conducting U-phase when a short pulse current flows in a reverse direction from the W-phase of the motor (MT) 1 to the V-phase.

<Reverse Voltage>

Figure 3:
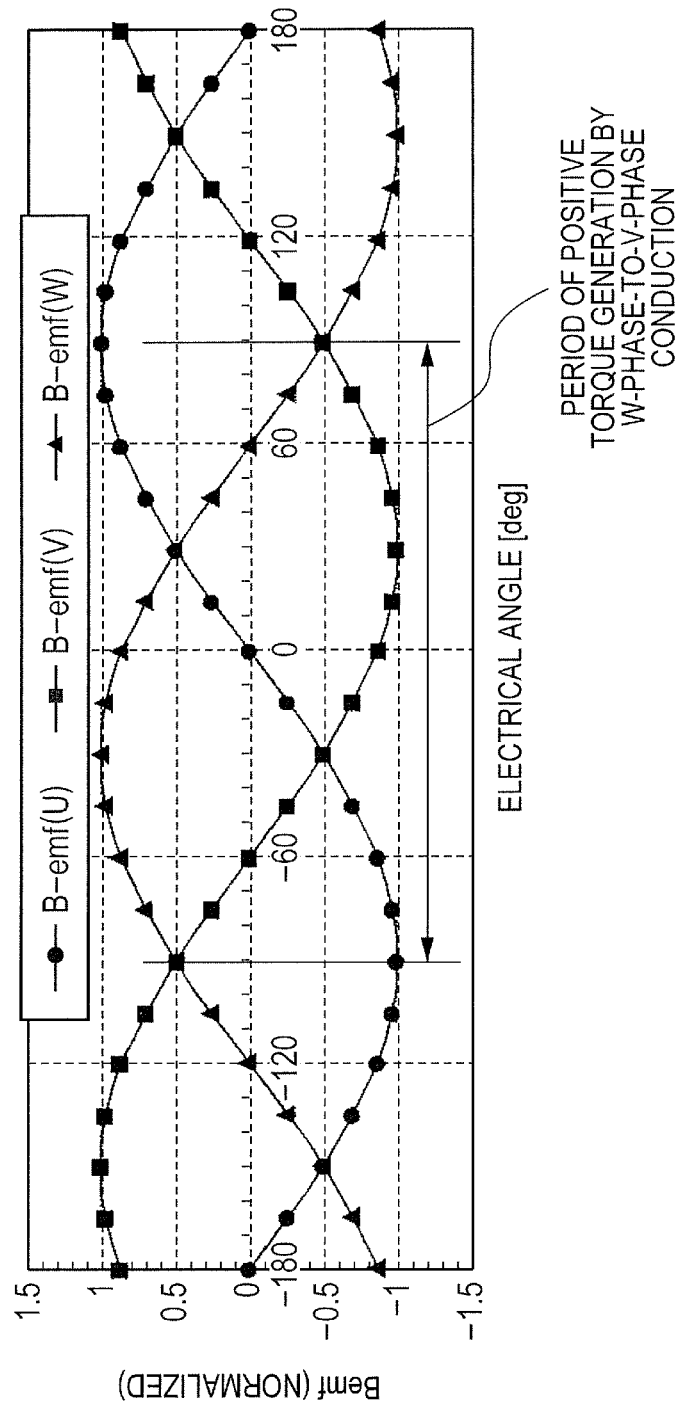
FIG. 3 is a diagram illustrating the waveforms of reverse voltages B-emf(U), B-emf(V), B-emf(W) developed across stator coils LU, LV, LW of the three-phase motor (MT) 1 due to its rotation in the motor drive control device according to the first embodiment, which is shown in FIG. 1.

FIG. 3 is a diagram illustrating the waveforms of the reverse voltages B-emf(U), B-emf(V), B-emf(W) developed across the stator coils LU, LV, LW of the three-phase motor (MT) 1 due to its rotation in the motor drive control device according to the first embodiment, which is shown in FIG. 1.

The reverse voltage B-emf(U) developed across the stator coil LU is indicated by a line with solid circles. The reverse voltage B-emf(V) developed across the stator coil LV is indicated by a line with solid squares. The reverse voltage B-emf(W) developed across the stator coil LW is indicated by a line with solid triangles.

<Total Normalized Induced Voltage>

Figure 4:
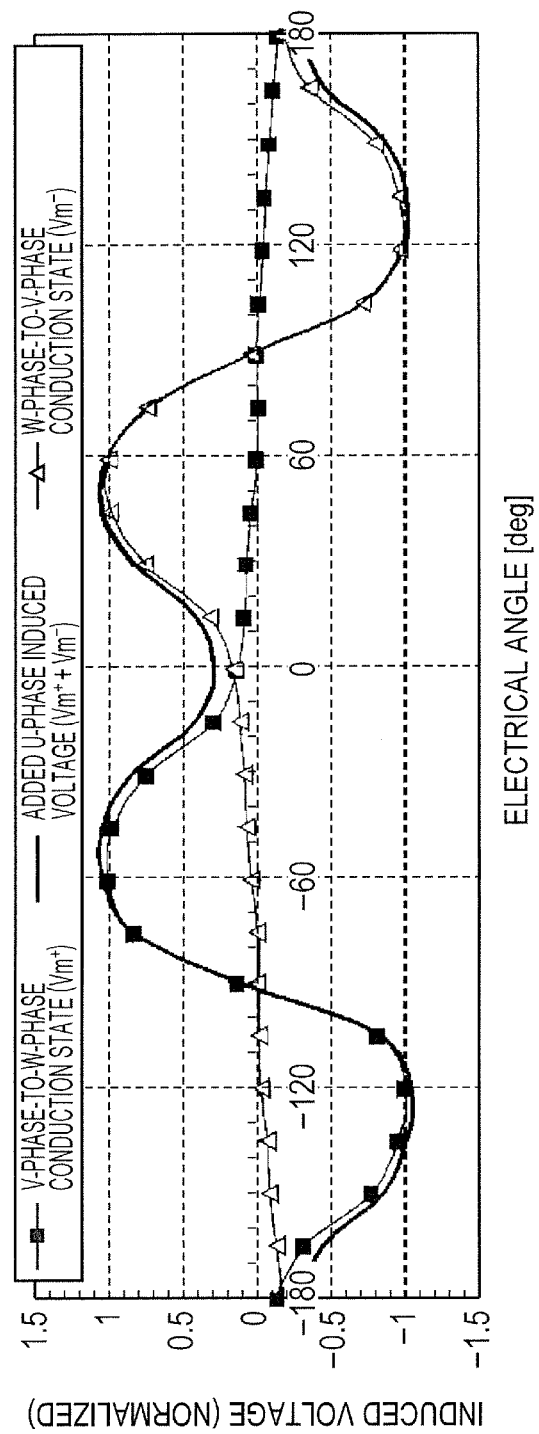
FIG. 4 is a diagram that relates to the motor drive control device according to the first embodiment, which is shown in FIG. 1, and illustrates the waveform of a normalized induced voltage derived from the sum of an induced voltage Vm+ developed in a non-conducting U-phase by the conduction of a forward-direction short pulse current shown in FIG. 2A and an induced voltage Vm− developed in the non-conducting U-phase by the conduction of a reverse-direction short pulse current shown in FIG. 2B.

FIG. 4 is a diagram that relates to the motor drive control device according to the first embodiment, which is shown in FIG. 1, and illustrates the waveform of a normalized induced voltage derived from the sum of the induced voltage Vm+ developed in a non-conducting U-phase by the conduction of a forward-direction short pulse current shown in FIG. 2A and an induced voltage Vm− developed in the non-conducting U-phase by the conduction of a reverse-direction short pulse current shown in FIG. 2B.

Referring to FIG. 4, the induced voltage Vm+ developed in the non-conducting U-phase by the conduction of the forward-direction short pulse current shown in FIG. 2A is indicated by a line with solid squares; the induced voltage Vm− developed in the non-conducting U-phase by the conduction of the reverse-direction short pulse current shown in FIG. 2B is indicated by a line with blank triangles; and the normalized induced voltage derived from the sum of the induced voltage Vm+ and induced voltage Vm− is indicated by a thick solid line. The polarity of the normalized induced voltage indicated by the thick solid line in FIG. 4 changes at intervals of an electrical angle of 180 degrees. Hence, the phase of the normalized induced voltage developed in the non-conducting U-phase, which is indicated by the thick solid line in FIG. 4, is advanced by an electrical angle of 90 degrees from the phase of the reverse voltage B-emf(U) developed in the stator coil LU, which is indicated by the line with solid circles in FIG. 3.

<Induced Voltage Determination Section>

Figure 5:
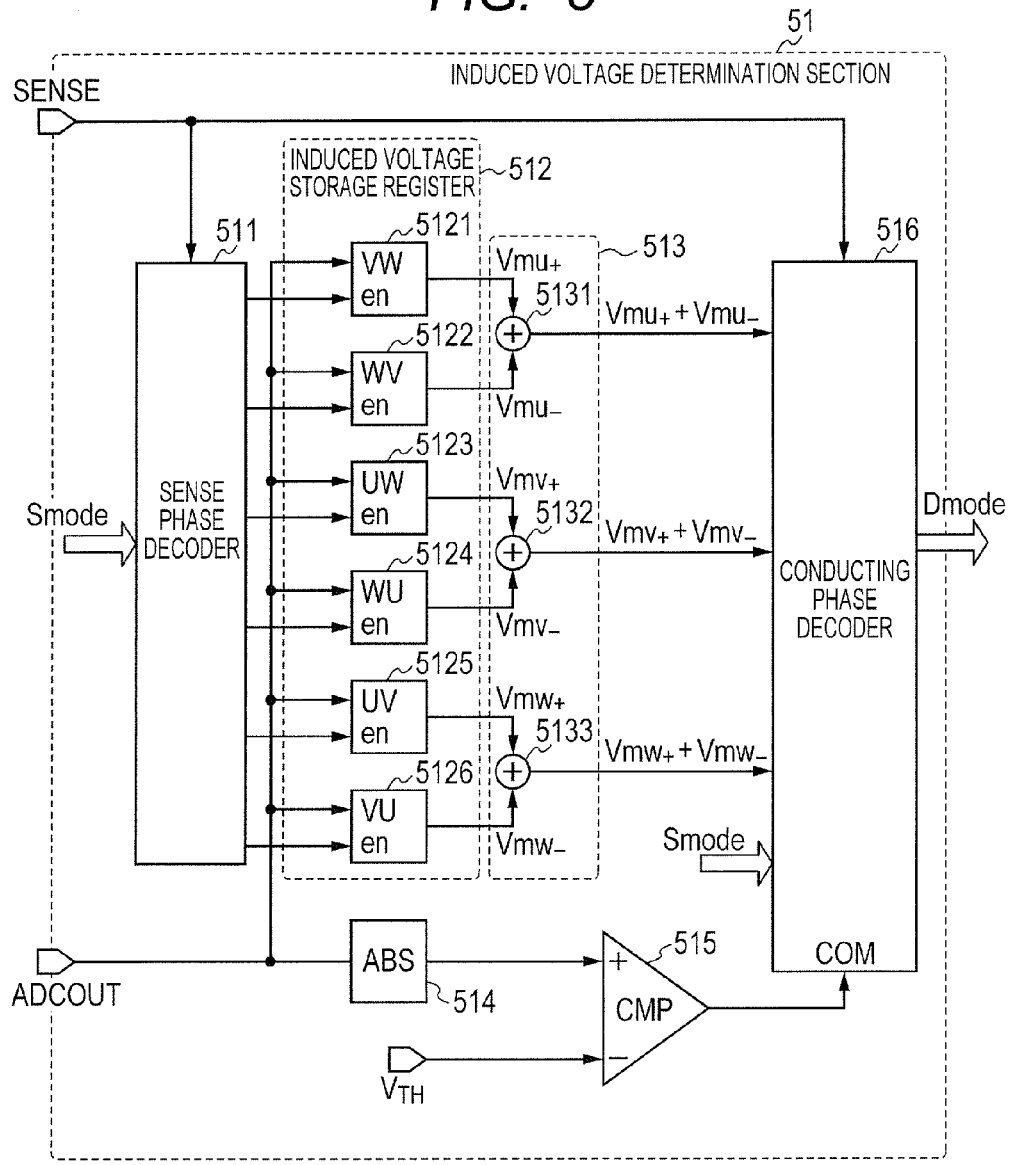
FIG. 5 is a diagram illustrating the configuration of an induced voltage determination section 51 in an initial acceleration controller 5 of the motor drive control device according to the first embodiment, which is shown in FIG. 1.

FIG. 5 is a diagram illustrating the configuration of the induced voltage determination section 51 in the initial acceleration controller 5 of the motor drive control device according to the first embodiment, which is shown in FIG. 1.

As shown in FIG. 5, the induced voltage determination section 51 includes a sense phase decoder 511, an induced voltage storage register 512, an addition section 513, an absolute value circuit 514, a comparator 515, and a conducting phase decoder 516.

In response to the sense signal SENSE, which is supplied from the sequencer 53 shown in FIG. 1 to specify an operation of detecting induced voltages of three phases, and to the initial acceleration conduction mode signal Smode, which indicates a total of six conduction states, namely, the conduction states of the pull-up and pull-down conducting phases of the U-, V-, and W-phases of the motor (MT) 1, the sense phase decoder 511 generates six storage enable signals en, which are to be supplied to the induced voltage storage register 512.

The output ADCOUT of the A/D converter 4B in the A/D conversion section 4 shown in FIG. 1 supplies an induced voltage digital conversion signal to six registers (first to sixth registers) 5121-5126 of the induced voltage storage register 512 and to the input terminal of the absolute value circuit 514.

At a timing at which the sense phase decoder 511 generates a first storage enable signal en, the first register 5121 stores a digital conversion signal of an induced voltage Vmu+, which is developed in a non-conducting U-phase by a short pulse current flowing in a forward direction from the V-phase of the motor (MT) 1 to the W-phase. At a timing at which the sense phase decoder 511 generates a second storage enable signal en, the second register 5122 stores a digital conversion signal of an induced voltage Vmu−, which is developed in the non-conducting U-phase by a short pulse current flowing in a reverse direction from the W-phase of the motor (MT) 1 to the V-phase.

At a timing at which the sense phase decoder 511 generates a third storage enable signal en, the third register 5123 stores a digital conversion signal of an induced voltage Vmv+, which is developed in a non-conducting V-phase by a short pulse current flowing in a forward direction from the U-phase of the motor (MT) 1 to the W-phase. At a timing at which the sense phase decoder 511 generates a fourth storage enable signal en, the fourth register 5124 stores a digital conversion signal of an induced voltage Vmv−, which is developed in the non-conducting V-phase by a short pulse current flowing in a reverse direction from the W-phase of the motor (MT) 1 to the U-phase.

At a timing at which the sense phase decoder 511 generates a fifth storage enable signal en, the fifth register 5125 stores a digital conversion signal of an induced voltage Vmw+, which is developed in a non-conducting W-phase by a short pulse current flowing in a forward direction from the U-phase of the motor (MT) 1 to the V-phase. At a timing at which the sense phase decoder 511 generates a sixth storage enable signal en, the sixth register 5126 stores a digital conversion signal of an induced voltage Vmw−, which is developed in the non-conducting W-phase by a short pulse current flowing in a reverse direction from the V-phase of the motor (MT) 1 to the U-phase.

The addition section 513 includes a first adder 5131, a second adder 5132, and a third adder 5133.

The first adder 5131 generates an added induced voltage (Vmu+)+(Vmu−) digital conversion signal by adding the induced voltage Vmu+ digital conversion signal, which is information stored in the first register 5121, to the induced voltage Vmu− digital conversion signal, which is information stored in the second register 5122.

The second adder 5132 generates an added induced voltage (Vmv+)+(Vmv−) digital conversion signal by adding the induced voltage Vmv+ digital conversion signal, which is information stored in the third register 5123, to the induced voltage Vmv− digital conversion signal, which is information stored in the fourth register 5124.

The third adder 5133 generates an added induced voltage (Vmw+)+(Vmw−) digital conversion signal by adding the induced voltage Vmw+ digital conversion signal, which is information stored in the fifth register 5125, to the induced voltage Vmw− digital conversion signal, which is information stored in the sixth register 5126.

The absolute value of the induced voltage digital conversion signal at the output ADCOUT of the A/D converter 4B, which is generated at the output terminal of the absolute value circuit 514, and the digital equivalent of the predetermined reference value $V_{TH}$ supplied from the parameter setup register 7A shown in FIG. 1 are compared by the comparator 515. A resulting comparator output signal COM is supplied to the conducting phase decoder 516.

The conducting phase decoder 516 generates the conducting phase indication output signal Dmode in response to the sense signal SENSE indicative of an operation performed to detect induced voltages of three phases, to the digital conversion signals (Vmu+)+(Vmu−), (Vmv+)+(Vmv−), (Vmw+)+(Vmw−) from the addition section 513, to the initial acceleration conduction mode signal Smode indicative of six conduction states, and to the comparator output signal COM of the comparator 515. Hence, the conducting phase decoder 516 determines the polarities of the added induced voltages of the U-, V-, and W-phases of the motor (MT) 1, which are generated by the induced voltage detector 3 and by the A/D conversion section 4, and judges whether the added induced voltages are higher or lower than the predetermined reference value $V_{TH}$. In this manner, the induced voltage determination section 51 generates the output signal Dmode, which indicates the pull-up and pull-down conducting phases of the U-, V-, and W-phases of the motor (MT) 1.

<Rotor Position Identification>

FIG. 6 is a diagram that relates to the motor drive control device according to the first embodiment, which is shown in FIGS. 1 and 5, and illustrates the waveforms of reverse voltages B-emf(U), B-emf(V), B-emf(W) of three-phase stator coils LU, LV, LW of the motor (MT) 1, three-phase added induced voltages (Vmu+)+(Vmu−), (Vmv+)+(Vmv−), (Vmw+)+(Vmw−), and an absolute value output ADCOUT of the absolute value circuit 514.

As shown in the table at the bottom of FIG. 6, the rotor position can be identified in steps of 60 degrees of electrical angle from a combination of pieces of polarity information (positive/negative) about the added induced voltages of three phases. When, for instance, the polarities of the added induced voltages of the U-, V- and W-phases are positive, positive, and negative, respectively, the rotor is found to be at an electrical angle between 0 and 60 degrees. In this instance, allowing a drive current to flow from the U-phase to the V-phase makes it possible to generate a normal rotation torque and rotate the rotor in a normal direction.

As described earlier, the conduction start phase for initial acceleration of the motor (MT) 1 is determined in accordance with the polarity information about the three-phase added induced voltages, which is derived from the induced voltage determination section 51 of the motor drive control device according to the first embodiment, which is shown in FIGS. 1 and 5. Therefore, the energization of the determined conduction start phase is initiated the next time the motor (MT) 1 is subjected to initial acceleration.

Further, as shown in FIG. 6, when the absolute value output ADCOUT, which corresponds to the three-phase added induced voltages (Vmu+)+(Vmu−), (Vmv+)+(Vmv−), (Vmw+)+(Vmw−), reaches the predetermined reference value $V_{TH}$, the conducting phase is changed to initially accelerate the motor (MT) 1.

<Drive Voltage Generator for Initial Acceleration>

FIG. 7 is a diagram illustrating the configuration of the drive voltage generator 6C in the motor drive control device according to the first embodiment, which is shown in FIG. 1.

The drive voltage generator 6C shown in FIG. 7 generates the drive voltage VDRV, which determines the normal rotation torque for the aforementioned initial acceleration.

As shown in FIG. 7, the drive voltage generator 6C includes a digital subtractor 6C1, a digital phase compensator 6C2, a digital clamp circuit 6C3, and a digital multiplier 6C4.

The digital subtractor 6C1 subtracts the current detection digital signal at the output ADCOUT of the A/D converter 4B from the current instruction value, which is supplied from the parameter setup register 7A. Therefore, a digital error output signal corresponding to the error between the current detection digital signal at the output ADCOUT of the A/D converter 4B and the current instruction value supplied from the parameter setup register 7A is supplied from the digital subtractor 6C1 to the input terminal of the digital phase compensator 6C2.

When the digital phase compensator 6C2 performs a digital integration process on the digital error output signal supplied from the digital subtractor 6C1, the output terminal of the digital phase compensator 6C2 generates a digital PWM duty output signal PWM Duty, which specifies the duty of PWM drive for determining the normal rotation torque for the aforementioned initial acceleration.

The PWM duty upper-limit clamp signal CLPWM from the parameter setup register 7A, which indicates a PWM duty upper-limit value, for instance, of 80%, a high-level clamp enable signal CLENA from the sequencer 53 in the initial acceleration controller 5, and the digital PWM duty output signal PWM Duty from the digital phase compensator 6C2 are supplied to the digital clamp circuit 6C3. Consequently, if the duty of PWM drive specified by the digital PWM duty output signal PWM Duty is less than 80% of the PWM duty upper-limit value, the output terminal of the digital clamp circuit 6C3 generates a digital PWM duty output signal PWM Duty of less than 80%. If, on the other hand, the duty of PWM drive specified by the digital PWM duty output signal PWM Duty is not smaller than 80% of the PWM duty upper-limit value, the output terminal of the digital clamp circuit 6C3 generates a value equivalent to 80% of the PWM duty upper-limit value specified by the PWM duty upper-limit clamp signal CLPWM. If a low-level clamp enable signal CLENA is supplied from the sequencer 53 in the initial acceleration controller 5 to the digital clamp circuit 6C3, a digital PWM duty output signal PWM Duty having a duty within the range from 0% to 100% is directly generated from the output terminal of the digital clamp circuit 6C3 without being clamped.

The digital multiplier 6C4 generates a digital drive voltage VDRV by multiplying the digital output signal of the digital clamp circuit 6C3 by a PWM cycle count.

In response to the digital drive voltage VDRV generated from the digital multiplier 6C4 in the drive voltage generator 6C, the PWM modulator 6B supplies a PWM signal corresponding to the duty specified by the digital drive voltage VDRV to the input terminal of the output drive controller 6A.

Consequently, if a high-level clamp enable signal CLENA is supplied to the digital clamp circuit 6C3, the PWM signal generated from the PWM modulator 6B is less than 80% of the PWM duty upper-limit value. If, on the other hand, a low-level clamp enable signal CLENA is supplied to the digital clamp circuit 6C3, the PWM signal generated from the PWM modulator 6B is a duty within the range from 0% to 100%.

Duties of the PWM drive control signals UPWM, VPWM, WPWM generated from the output drive controller 6A are determined by the duty of the PWM signal generated from the PWM modulator 6B. The initial acceleration output signals UPON, UNON, VPON, VNON, WPON, WNON of the initial acceleration controller 5 select a phase in which the output drive controller 6A outputs the PWM drive control signals.

Consequently, while a high-level clamp enable signal CLENA is supplied to the digital clamp circuit 6C3, the duties of the PWM drive control signals UPWM, VPWM, WPWM correspond to a digital PWM duty output signal PWM Duty that is less than 80% of the PWM duty upper-limit value. On the other hand, while a low-level clamp enable signal CLENA is supplied to the digital clamp circuit 6C3, the duties of the PWM drive control signals UPWM, VPWM, WPWM correspond to a digital PWM duty output signal PWM Duty having a duty within the range from 0% to 100%.

The motor drive current $I_{SENSE}$ that has energized the power MOSFETs of the output driver 8 is converted to a voltage by the DC shunt resistor Rsns of the current detector 9A. The voltage is amplified by the sense amplifier 9B. The current detection voltage CRNTOUT of the sense amplifier 9B is supplied to the A/D converter 4B in the A/D conversion section 4. The current detection digital signal at the output ADCOUT of the A/D converter 4B is supplied to the digital subtractor 6C1 in the drive voltage generator 6C.

<Initiation of Conduction for Initial Acceleration>

Figure 8:
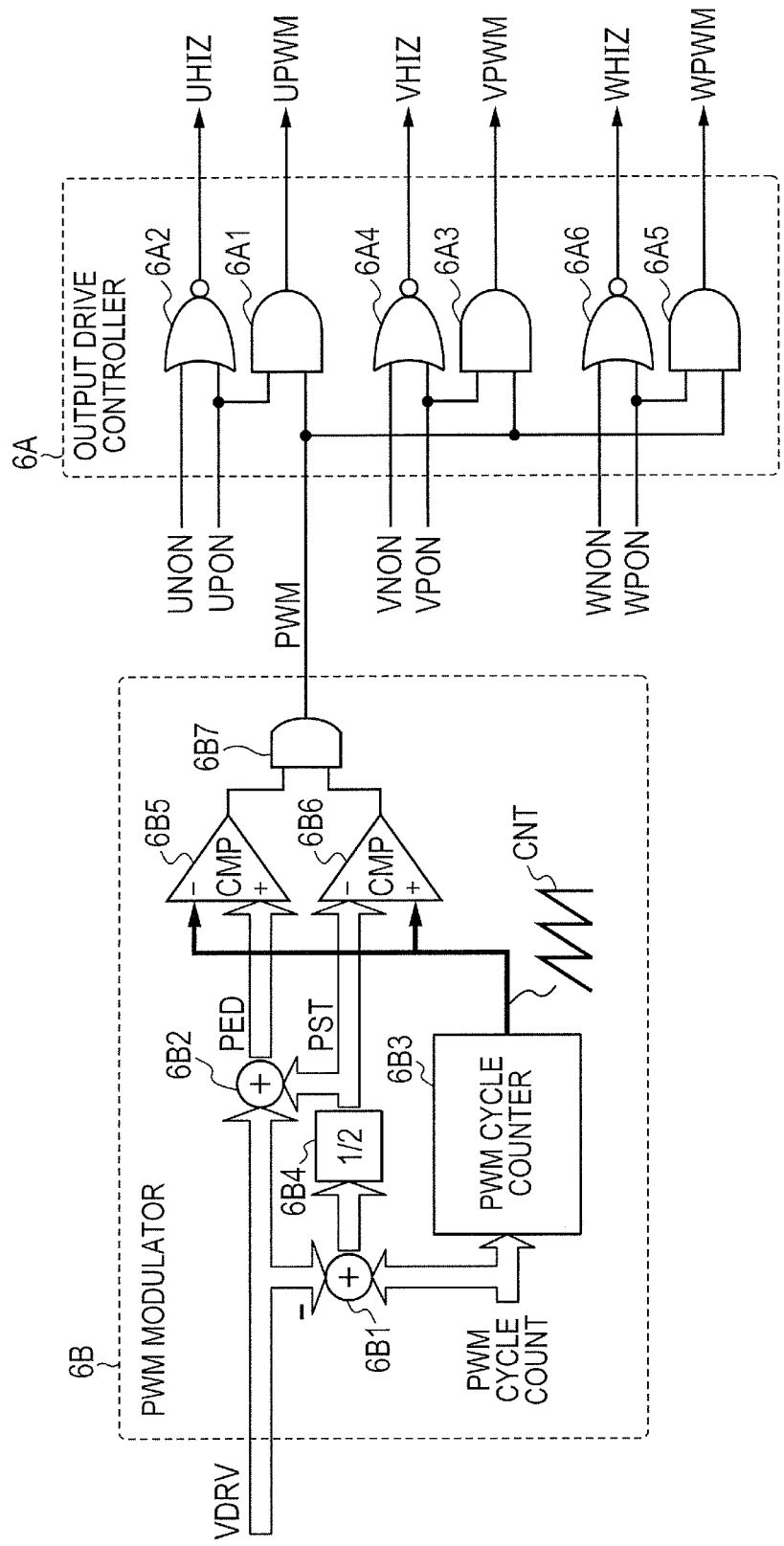
FIG. 8 is a diagram illustrating the configuration of a PWM modulator 6B and of an output drive controller 6A that prevails at the beginning of conduction for initial acceleration in the motor drive control device according to the first embodiment, which is shown in FIG. 1.

FIG. 8 is a diagram illustrating the configuration of the PWM modulator 6B and of the output drive controller 6A that prevails at the beginning of conduction for initial acceleration in the motor drive control device according to the first embodiment, which is shown in FIG. 1.

As shown in FIG. 8, the PWM modulator 6B includes a subtractor 6B1, an adder 6B2, a PWM cycle counter 6B3, a divider 6B4, comparators 6B5, 6B6, and an AND circuit 6B7. The digital drive voltage VDRV generated from the drive voltage generator 6C is supplied to the subtractor 6B1 and to the adder 6B2. The PWM cycle count is supplied to the subtractor 6B1 and to the PWM cycle counter 6B3. The PWM cycle counter 6B3 generates a count output CNT in response to the PWM cycle count. The result of subtraction performed by the subtractor 6B1 with respect to the digital drive voltage VDRV and PWM cycle count is converted by the divider 6B4 to a PST signal, which is a digital value reduced to one-half of its original value. The PST signal is supplied to the adder 6B2 and to the comparator 6B6. The adder 6B2 adds the PST signal to the digital drive voltage VDRV. The result of this addition is supplied to the comparator 6B5 as a PED signal. As the count output CNT from the PWM cycle counter 6B3 is supplied to the comparators 6B5, 6B6, the comparators 6B5, 6B6 digitally compare the count output CNT with the PED signal or with the PST signal. The results of digital comparisons performed by the comparators 6B5, 6B6 are supplied to the two input terminals of the AND circuit 6B7. The output terminal of the AND circuit 6B7 generates a PWM signal that serves as the output of the PWM modulator 6B.

As shown in FIG. 8, the output drive controller 6A includes AND circuits 6A1, 6A3, 6A5 and NOR circuits 6A2, 6A4, 6A6. The initial acceleration output signals UPON, UNON, VPON, VNON, WPON, WNON generated from the decoder 52 in the initial acceleration controller 5 are supplied to a plurality of input terminals of the AND circuits 6A1, 6A3, 6A5 and NOR circuits 6A2, 6A4, 6A6 in the output drive controller 6A. A plurality of output terminals of the AND circuits 6A1, 6A3, 6A5 and NOR circuits 6A2, 6A4, 6A6 in the output drive controller 6A generate the output control signals UPWM, UHIZ, VPWM, VHIZ, WPWM, WHIZ of the output drive controller 6A.

When the initial acceleration output signal UPON is at a high level ("1"), the PWM signal output from the PWM modulator 6B is selected by the AND circuit 6A1 in the output drive controller 6A so that the output control signal UPWM is generated from the output terminal of the AND circuit 6A1 as a PWM selection output signal. Thus, in response to the output control signal UPWM, which serves as the PWM selection output signal of the output drive controller 6A, the U-phase pull-down power MOSFET M4 in the output driver 8 shown in FIG. 1 is PWM-driven to the ON state to energize the U-phase of the motor (MT) 1. When the initial acceleration output signals UPON, UNON are both at a low level ("0"), the AND circuit 6A1 does not generate the output control signal UPWM as the PWM selection output signal, but the output terminal of the NOR circuit 6A2 generates the output control signal UHIZ. Thus, in response to the output control signal UHIZ, which serves as a PWM non-selection output signal of the output drive controller 6A, the U-phase pull-up power MOSFET M1 and pull-down power MOSFET M4 in the output driver 8 shown in FIG. 1 are maintained in the OFF state to leave the U-phase of the motor (MT) 1 unenergized.

When the initial acceleration output signal VPON is at the high level ("1"), the PWM signal output from the PWM modulator 6B is selected by the AND circuit 6A3 in the output drive controller 6A so that the output control signal VPWM is generated from the output terminal of the AND circuit 6A3 as the PWM selection output signal. Thus, in response to the output control signal UPWM, which serves as the PWM selection output signal of the output drive controller 6A, the V-phase pull-down power MOSFET M5 in the output driver 8 shown in FIG. 1 is PWM-driven to the ON state to energize the V-phase of the motor (MT) 1. When the initial acceleration output signals VPON, VNON are both at the low level ("0"), the AND circuit 6A3 does not generate the output control signal VPWM as the PWM selection output signal, but the output terminal of the NOR circuit 6A4 generates the output control signal VHIZ. Thus, in response to the output control signal VHIZ, which serves as the PWM non-selection output signal of the output drive controller 6A, the V-phase pull-up power MOSFET M2 and pull-down power MOSFET M5 in the output driver 8 shown in FIG. 1 are maintained in the OFF state to leave the V-phase of the motor (MT) 1 unenergized.

When the initial acceleration output signal WPON is at the high level ("1"), the PWM signal output from the PWM modulator 6B is selected by the AND circuit 6A5 in the output drive controller 6A so that the output control signal WPWM is generated from the output terminal of the AND circuit 6A5 as the PWM selection output signal. Thus, in response to the output control signal WPWM, which serves as the PWM selection output signal of the output drive controller 6A, the W-phase pull-down power MOSFET M6 in the output driver 8 shown in FIG. 1 is PWM-driven to the ON state to energize the W-phase of the motor (MT) 1. When the initial acceleration output signals WPON, WNON are both at the low level ("0"), the AND circuit 6A5 does not generate the output control signal WPWM as the PWM selection output signal, but the output terminal of the NOR circuit 6A6 generates the output control signal WHIZ. Thus, in response to the output control signal WHIZ, which serves as the PWM non-selection output signal of the output drive controller 6A, the W-phase pull-up power MOSFET M3 and pull-down power MOSFET M6 in the output driver 8 shown in FIG. 1 are maintained in the OFF state to leave the W-phase of the motor (MT) 1 unenergized.

As described above, the output drive controller 6A responds to the initial acceleration output signals UPON, UNON, VPON, VNON, WPON, WNON generated from the decoder 52 in the initial acceleration controller 5 and energizes the three-phase motor (MT) 1 for initial acceleration purposes.

Figure 9:
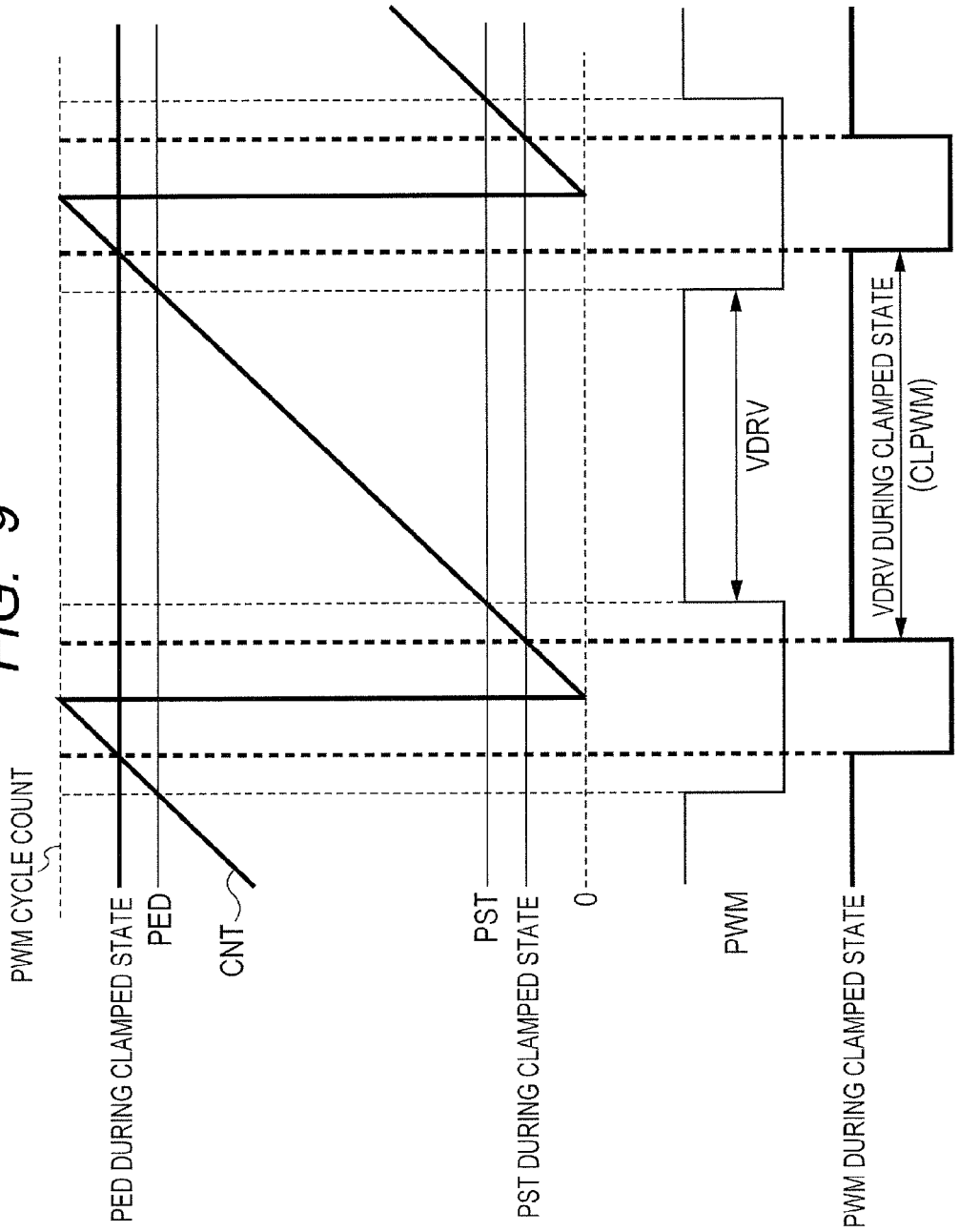
FIG. 9 is a waveform diagram illustrating how the PWM modulator 6B and the output drive controller 6A operate at the beginning of conduction for initial acceleration in the motor drive control device according to the first embodiment, which is shown in FIG. 8.

FIG. 9 is a waveform diagram illustrating how the PWM modulator 6B and the output drive controller 6A operate at the beginning of conduction for initial acceleration in the motor drive control device according to the first embodiment, which is shown in FIG. 8.

FIG. 9 shows the PWM cycle count to be supplied to the subtractor 6B1 and to the PWM cycle counter 6B3, the PED signal derived from the addition performed in the adder 6B2, the count output CNT of the PWM cycle counter 6B3, the PST signal generated by the divider 6B4, and the PWM signal output from the PWM modulator 6B, which is generated from the output terminal of the AND circuit 6B7.

When the count output CNT is higher than the low-level PST signal and lower than the high-level PED signal as indicated at the leftmost point in FIG. 9, the output of the comparator 6B6 is at the high level ("1"), and the output of the comparator 6B5 is at the high level ("1"). Thus, the PWM signal output from the PWM modulator 6B is at the high level ("1").

When the count output CNT is higher than the low-level PST signal and higher than the high-level PED signal as indicated at the second leftmost point in FIG. 9, the output of the comparator 6B6 is at the high level ("1"), and the output of the comparator 6B5 is at the low level ("0"). Thus, the PWM signal output from the PWM modulator 6B is at the low level ("0").

When the count output CNT is lower than the low-level PST signal and lower than the high-level PED signal as indicated at the third leftmost point in FIG. 9, the output of the comparator 6B6 is at the low level ("0"), and the output of the comparator 6B5 is at the high level ("1"). Thus, the PWM signal output from the PWM modulator 6B is at the low level ("0").

When the count output CNT is higher than the low-level PST signal and lower than the high-level PED signal as indicated at the fourth leftmost point in FIG. 9, the output of the comparator 6B6 is at the high level ("1"), and the output of the comparator 6B5 is at the high level ("1"). Thus, the PWM signal output from the PWM modulator 6B is at the high level ("1").

When the count output CNT is higher than the low-level PST signal and higher than the high-level PED signal as indicated at the fifth leftmost point in FIG. 9, the output of the comparator 6B6 is at the high level ("1"), and the output of the comparator 6B5 is at the low level ("0"). Thus, the PWM signal output from the PWM modulator 6B is at the low level ("0").

When the count output CNT is lower than the low-level PST signal and lower than the high-level PED signal as indicated at the sixth leftmost point in FIG. 9, the output of the comparator 6B6 is at the low level ("0"), and the output of the comparator 6B5 is at the high level ("1"). Thus, the PWM signal output from the PWM modulator 6B is at the low level ("0").

When the count output CNT is higher than the low-level PST signal and lower than the high-level PED signal as indicated at the rightmost point in FIG. 9, the output of the comparator 6B6 is at the high level ("1"), and the output of the comparator 6B5 is at the high level ("1"). Thus, the PWM signal output from the PWM modulator 6B is at the high level ("1").

Consequently, a period (duty) during which the PWM signal output from the PWM modulator 6B is at the high level ("1") is determined by the digital drive voltage VDRV generated from the drive voltage generator 6C as indicated in FIG. 9. However, if the digital drive voltage VDRV generated from the drive voltage generator 6C is equal to the PWM cycle count, the PST signal is zero so that the PED signal is the digital drive voltage VDRV, namely, the PWM cycle count. Therefore, the duty of the PWM signal output from the PWM modulator 6B is at risk of being 100%.

As a result, in the above instance, the induced voltage to be developed in a non-conducting phase of the motor (MT) 1 will not be generated when the duty of the PWM signal is 100% as indicated in FIG. 14B. Therefore, the induced voltage determination section 51 cannot judge whether the induced voltage is higher or lower than the predetermined reference value $V_{TH}$. Hence, no change occurs in the output signal Dmode, which indicates pull-up and pull-down conducting phases of the U-, V-, and W-phases of the motor (MT) 1 from the output of the induced voltage determination section 51. This makes it difficult to properly start up the motor (MT) 1.

Under the above circumstances, the motor drive control device according to the first embodiment, which is shown in FIGS. 1 and 7, operates to initiate the conduction for initial acceleration in such a manner that the sequencer 53 in the initial acceleration controller 5 supplies the clamp enable signal CLENA to the drive voltage generator 6C, and that the parameter setup register 7A supplies the PWM duty upper-limit clamp signal CLPWM to the drive voltage generator 6C.

The clamp enable signal CLENA can clamp an increase in the duties of PWM drive control signals UPWM, VPWM, WPWM, which are generated from the output drive controller 6A when conduction starts for initial acceleration after the initial rotor position is identified by the induced voltage detector 3. The PWM duty upper-limit clamp signal CLPWM sets the PWM duty upper-limit value for the duty clamp operation on the PWM drive control signals UPWM, VPWM, WPWM, which is enabled by the clamp enable signal CLENA.

It is therefore assumed that a high-level clamp enable signal CLENA is supplied from the sequencer 53 in the initial acceleration controller 5 to the drive voltage generator 6C, and that a PWM duty upper-limit clamp signal CLPWM indicating a PWM duty upper-limit value, for instance, of 80% is supplied from the parameter setup register 7A to the drive voltage generator 6C. The error between the current detection digital signal at the output ADCOUT of the A/D converter 4B and the current instruction value supplied from the parameter setup register 7A is calculated by the drive voltage generator 6C. A drive voltage VDRV corresponding to the error is supplied from the output of the drive voltage generator 6C to the input of the PWM modulator 6B. It should be noted, however, that the maximum drive voltage VDRV to be supplied is limited to 80% of the error.

As shown in FIG. 9, the drive voltage generator 6C generates the digital drive voltage VDRV whose maximum value is limited to 80% of the error. This ensures that the PWM modulator 6B supplies a PWM signal whose duty is limited to 80% to the input of the output drive controller 6A. As a result, the upper limit on an increase in the duties of the PWM drive control signals UPWM, VPWM, WPWM generated from the output drive controller 6A can be clamped at 80% as specified by the PWM duty upper-limit clamp signal CLPWM.

Consequently, referring to the waveform diagram of FIG. 9, the motor drive control device according to the first embodiment, which is shown in FIGS. 1 and 7, operates so that the duty of the PWM signal generated from the PWM modulator 6B is clamped at a numerical value specified by the PWM duty upper-limit clamp signal CLPWM, for example, at 80%. Hence, the induced voltage determination section 51 included in the motor drive control device according to the first embodiment, which is shown in FIGS. 1 and 7, can judge whether the induced voltage is higher or lower than the predetermined reference value $V_{TH}$. This makes it possible to properly change the output signal Dmode, which is output from the induced voltage determination section 51 to indicate the pull-up and pull-down conducting phases of the U-, V-, and W-phases of the motor (MT) 1. As a result, the motor (MT) 1 can be steadily started up.

<Operating Sequence>

Figure 10:
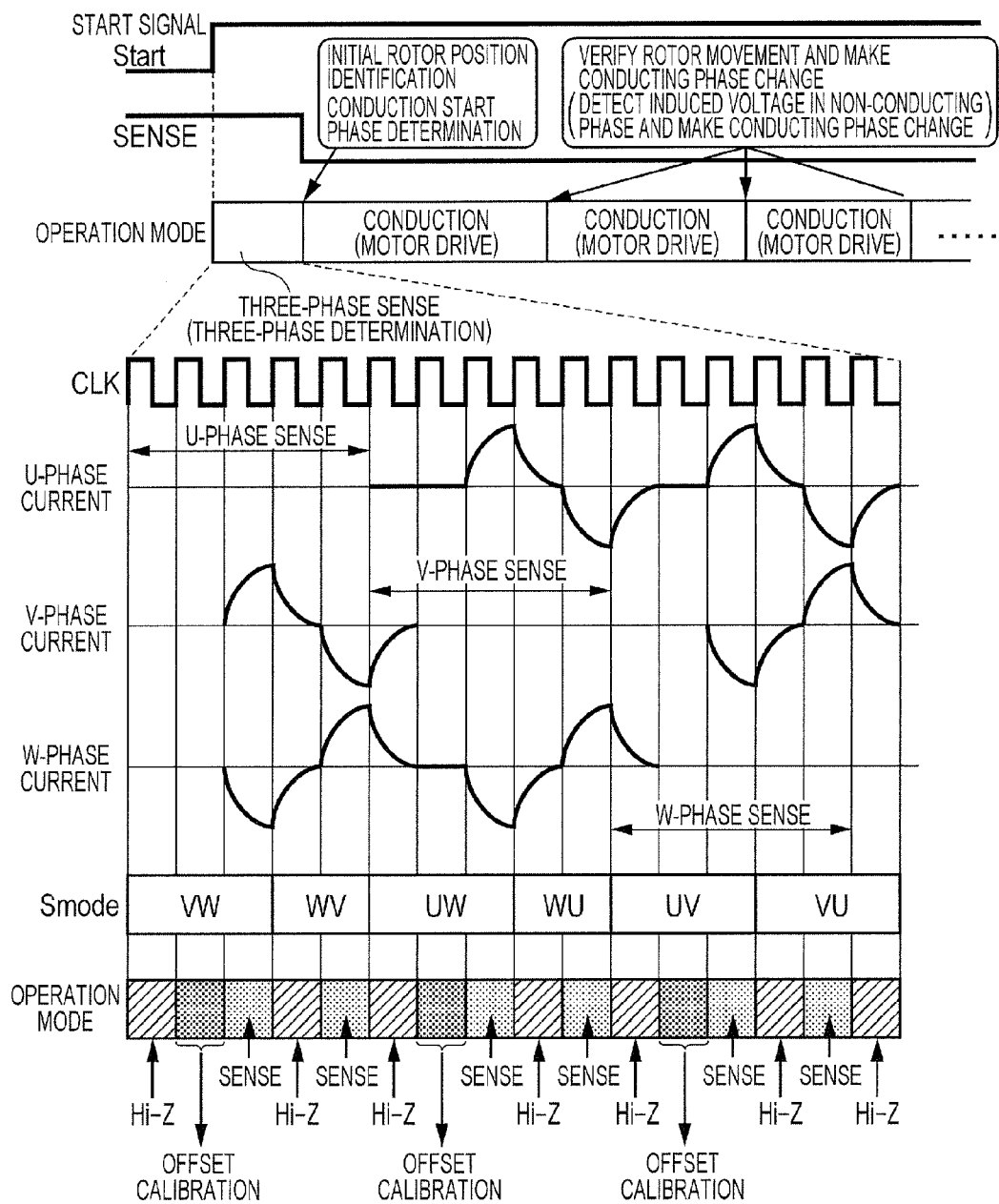
FIG. 10 is an operating sequence diagram illustrating a rotor position identification operation based on a three-phase sense and a conducting operation for initial acceleration, which are performed by the motor drive control device according to the first embodiment, which is shown in FIGS. 1 and 7.

FIG. 10 is an operating sequence diagram illustrating a rotor position identification operation based on a three-phase sense and a conducting operation for initial acceleration, which are performed by the motor drive control device according to the first embodiment, which is shown in FIGS. 1 and 7.

As shown in FIG. 10, the rotor position identification operation based on a three-phase sense starts in response to the high level of the start signal Start for starting the rotation of the three-phase motor (MT) 1, which is supplied from the parameter setup register 7A, and to a high-level sense signal SENSE for instructing the induced voltage detector 3 to detect induced voltages of three phases.

An enlarged diagram included in FIG. 10 shows the details of the rotor position identification operation based on a three-phase sense.

At first, during a U-phase sense, offset calibration is performed after the U-, V-, and W-phases are all placed in an output high impedance state Hi-Z. Subsequently, a short pulse current flows in the forward direction from the V-phase to the W-phase to measure the induced voltage Vmu+ developed in a non-conducting U-phase. After the U-, V-, and W-phases are all placed in the output high impedance state Hi-Z again, a short pulse current flows in the reverse direction from the W-phase to the V-phase to measure the induced voltage Vmu− developed in the non-conducting U-phase. In this manner, an added digital induced voltage (Vmu+)+(Vmu−) of the U-phase can be measured.

As for a V-phase sense and a W-phase sense, an added digital induced voltage (Vmv+)+(Vmv−) of the V-phase and an added digital induced voltage (Vmw+)+(Vmw−) of the W-phase can be measured in the same manner as for the above-described U-phase sense in accordance with the output high impedance state Hi-Z, offset calibration, and induced voltage sense regarding the V-phase, and with the output high impedance state Hi-Z, offset calibration, and induced voltage sense regarding the W-phase.

As described with reference to the table at the bottom of FIG. 6, the initial rotor position is identified in accordance with the polarity information (positive/negative) about the added digital induced voltages of the U-, V-, and W-phases. Further, the normal rotation torque is generated to determine the conduction start phase for rotating the rotor in the normal direction.

During a first conducting operation for initial acceleration, the PWM drive current flows to the two stator coils of the conduction start phase determined as described above for the purpose of performing a first initial acceleration. Even while PWM drive is being provided for the first conducting operation, the induced voltage developed in a non-conducting phase is detected. In other words, the absolute value output ADCOUT of the absolute value circuit 514, which corresponds to the three-phase added induced voltages (Vmu+)+(Vmu−), (Vmv+)+(Vmv−), (Vmw+)+(Vmw−), reaches the predetermined reference value $V_{TH}$ as described with reference to FIG. 6, the conducting phase is changed to initially accelerate the motor (MT) 1. When the absolute value output ADCOUT for the first conducting operation reaches the predetermined reference value $V_{TH}$, a first conducting phase change is made to initiate the PWM drive for a second conducting operation for initial acceleration. While the PWM drive is being provided for the second conducting operation, the induced voltage developed in a non-conducting phase is also detected. The absolute value output ADCOUT for the second conducting operation then reaches the predetermined reference value $V_{TH}$ so that a second conducting phase change is made to initiate the PWM drive for a third conducting operation for initial acceleration.

The motor drive control device according to the first embodiment, which is shown in FIGS. 1, 5, and 7, operates in accordance with the operating sequence for initial acceleration, which is shown in FIG. 10, so that the upper-limit duty values for PWM drive for the U-, V-, and W-phases can be variably set as desired to a value not greater than 100%. This enables the induced voltage determination section 51 to determine the polarities of the induced voltages in the U-, V-, and W-phases of the motor (MT) 1 and judge whether the induced voltages are higher or lower than the predetermined reference value $V_{TH}$. Hence, the output signal Dmode indicative of a conducting phase is properly generated so that the motor (MT) 1 can be properly started up.

More specifically, the parameter setup register 7A supplies the PWM duty upper-limit clamp signal CLPWM to the drive voltage generator 6C, and the sequencer 53 supplies a high-level clamp enable signal CLENA to the drive voltage generator 6C. Therefore, when the PWM duty upper-limit clamp signal CLPWM for setting the PWM duty upper-limit value, for instance, to 80% is supplied to the drive voltage generator 6C, the upper-limit duty values for PWM drive can be variably set as desired.

When the PWM drive for the third conducting operation depicted in the operating sequence diagram of FIG. 10 is completed, the acceleration operation changes from initial acceleration to final acceleration. This change can be made upon detection of the fact that the revolving speed of the motor (MT) 1 has reached a predetermined value. The change can also be made upon detection of the fact that a predetermined period of time has elapsed after a level change in the start signal START from low to high or a level change in the sense signal SENSE from high to low.

During the final acceleration subsequent to the above acceleration operation change, the induced voltage detector 3 in the motor drive control device according to the first embodiment, which is shown in FIG. 1, detects a combined voltage, which is a combination of the reverse voltage shown in FIG. 3 and the normalized induced voltage shown in FIG. 4. Consequently, when the absolute value of the combined voltage reaches the predetermined reference value $V_{TH}$, the induced voltage determination section 51 in the initial acceleration controller 5 makes a conducting phase change for the purpose of subjecting the motor (MT) 1 to the final acceleration. During the period of the final acceleration, the clamp enable signal CLENA supplied from the sequencer 53 to the drive voltage generator 6C is at the low level. Therefore, in response to the low-level clamp enable signal CLENA, the drive voltage generator 6C directly generates, with clamping, a digital PWM duty output signal PWM Duty having a duty within the range from 0% to 100% at the output terminal of the digital clamp circuit 6C3.

Even when the duty is 100%, the reverse voltage is detected during the final acceleration. Therefore, the acceleration operation can be performed without causing a problem. Further, as the duty is not limited anymore, the final acceleration of the motor (MT) 1 can be steadily performed by using a high acceleration torque.

Second Embodiment

<Improved Configuration of Motor Drive Control Device>

When the motor drive control device according to the first embodiment, which is shown in FIGS. 1, 5, and 7, is used, the induced voltages in the U-, V-, and W-phases of the motor (MT) 1 may fail to reach the predetermined reference value $V_{TH}$ during initial acceleration due, for instance, to a temperature rise caused by heat generation or to a decrease in the power supply voltage, thereby making it impossible to make a conducting phase change, interrupting an ongoing initial acceleration, and causing the motor (MT) 1 to fail in startup.

A second embodiment of the present invention, which is a technology effective for reducing the possibility of startup failure in the motor (MT) 1, will now be described.

FIG. 11 is a diagram illustrating the configuration of the induced voltage determination section 51 in the initial acceleration controller 5 of the motor drive control device according to the second embodiment.

The induced voltage determination section 51 according to the second embodiment, which is shown in FIG. 11, differs from the induced voltage determination section 51 according to the first embodiment, which is shown in FIG. 5, in that a reference value change circuit 517 is added to the former.

The second embodiment depicted in FIG. 11 is configured so that when the absolute value output ADCOUT of the absolute value circuit 514 fails to reach the predetermined reference value $V_{TH}$, a polarity determination signal POL of the absolute value circuit 514 changes to switch to a conducting phase advanced by one increment from a normal conducting phase. In such an instance, the reference value change circuit 517 supplies a sub-reference value $V_{THSUB}$, which is lower than the predetermined reference value $V_{TH}$, to an inverting input terminal—of the comparator 515. The change in the polarity determination signal POL, which occurs when the predetermined reference value $V_{TH}$ cannot be reached, coincides with a change in the next conduction state. This ensures that the next detection phase reverts to normal upon switching to a conducting phase advanced by one increment. Further, switching has been made to the sub-reference value $V_{THSUB}$ lower than the reference value $V_{TH}$, which was not detected once. Therefore, the second embodiment depicted in FIG. 11 ensures that the absolute value output ADCOUT of the absolute value circuit 514 reaches the sub-reference value $V_{THSUB}$, which is relatively low.

Thus, a conducting phase change can be made. This makes it possible to avoid the interruption of the initial acceleration and reduce the possibility of startup failure in the motor (MT) 1. In the induced voltage determination section 51 according to the second embodiment, which is shown in FIG. 11, the comparator output signal COM of the comparator 515 and the polarity determination signal POL of the absolute value circuit 514 are both supplied to the conducting phase decoder 516.

FIG. 12 is a diagram that relates to the motor drive control device including the induced voltage determination section 51 according to the second embodiment, which is shown in FIG. 11, and illustrates the waveforms of the reverse voltages of three-phase stator coils LU, LV, LW of the motor (MT) 1, the waveforms of the three-phase added induced voltages, the waveform of the absolute value output ADCOUT of the absolute value circuit 514, the waveform of the comparator output signal COM, and the waveform of the polarity determination signal POL.

As shown in FIG. 12, if the absolute value output ADCOUT from the absolute value circuit 514 has reached the predetermined reference value $V_{TH}$, the comparator 515 generates a normal comparator output signal COM. However, if, on the other hand, the absolute value output ADCOUT from the absolute value circuit 514 has not reached the predetermined reference value $V_{TH}$, the comparator 515 does not generate the normal comparator output signal COM. More specifically, the comparator 515 does not generate a normal, high-level comparator output signal COM at a timing corresponding to an electrical angle of 60 degrees.

Consequently, the conducting phase decoder 516 in the induced voltage determination section 51 according to the second embodiment shown, for instance in FIG. 11 makes time measurement to detect that the comparator 515 does not supply the normal, high-level comparator output signal COM at a predetermined timing. Accordingly, the conducting phase decoder 516 operates to switch to a conducting phase advanced by one increment from a normal conducting phase when the polarity determination signal POL changes. Further, when a conducting phase change is made, the reference value change circuit 517 supplies the sub-reference value $V_{THSUB}$, which is lower than the predetermined reference value $V_{TH}$, to the inverting input terminal—of the comparator 515.

Hence, even if the absolute value output ADCOUT from the absolute value circuit 514 fails to reach the predetermined reference value $V_{TH}$ due to some abnormality as shown in FIG. 12, the polarity determination signal POL can make a conducting phase change. A change in the polarity determination signal POL coincides with a change in the next conduction state. This ensures that the next detection phase reverts to normal upon switching to a conducting phase advanced by one increment. Further, switching has been made to the sub-reference value $V_{THSUB}$ lower than the reference value $V_{TH}$, which was not detected once. Therefore, the absolute value output ADCOUT of the absolute value circuit 514 reaches the sub-reference value $V_{THSUB}$, which is relatively low. Thus, a subsequent conducting phase change can be made. This makes it possible to avoid the interruption of the initial acceleration and reduce the possibility of startup failure in the motor (MT) 1.

As described above, if a temporary abnormality occurs during an initial acceleration operation, the second embodiment, which is depicted in FIGS. 11 and 12, can skip such an abnormally timed phase change and switch to supply the sub-reference value, which is lower than the predetermined reference value, to the inverting input terminal—of the comparator 515. Therefore, at the next timing point, the absolute value output ADCOUT of the absolute value circuit 514 reaches the sub-reference value $V_{THSUB}$, which is relatively low. Hence, a conducting phase change can be made. This makes it possible to avoid the interruption of the initial acceleration and reduce the possibility of startup failure in the motor (MT) 1. Upon detection of the fact that the absolute value output ADCOUT of the absolute value circuit 514 has reached the sub-reference value $V_{THSUB}$, which is relatively low, a predetermined number of times, the reference value to be supplied to the inverting input terminal—of the comparator 515 can be changed from the relatively low sub-reference value $V_{THSUB}$ to the predetermined reference value $V_{TH}$.

While the present invention contemplated by its inventors has been described in detail in terms of preferred embodiments, it is to be understood that the present invention is not limited to those preferred embodiments, but extends to various modifications that nevertheless fall within the scope of the appended claims.

For example, the pull-up power MOSFETs M1, M2, M3 included in the output driver 8 are not limited to N-channel MOSFETs. P-channel MOSFETs may also be used as the pull-up power MOSFETs M1, M2, M3.

Further, the pull-up power MOSFETs M1, M2, M3 and pull-down power MOSFETs M4, M5, M6 included in the output driver 8 are not limited to MOSFETs. Insulated-gate bipolar power transistors (IGBTs) may be used in place of the power MOSFETs.

The foregoing embodiments have been described on the assumption that they are applied to a motor drive control device for providing drive control of a three-phase DC motor. However, the present invention can also be applied to a motor drive control device for providing drive control of a multiphase DC motor.

Moreover, the present invention is applicable not only to a motor drive control device that provides drive control of a spindle motor for rotating a magnetic disk of a hard disk drive (HDD), but also to a motor drive control device that provides drive control of a cooling fan motor for a hard disk drive (HDD) or an optical disk drive.

What is claimed is:

1. A motor drive control device comprising:
   a voltage detector;
   an A/D conversion section;
   an initial acceleration controller;
   output drive controllers;
   an output driver; and
   a current detector;
   wherein the output driver includes a plurality of power transistors and an output pre-driver, the power transistors being adapted to drive a multiphase DC motor, the output pre-driver being adapted to drive a plurality of input electrodes of the power transistors;
   wherein the current detector is capable of detecting a motor drive current that flows to the multiphase DC motor, detected information about the motor drive current being converted to a current detection digital signal by the A/D conversion section;
   wherein the output drive controllers supply PWM drive output signals for PWM drive to the output pre-driver in such a manner as to minimize the error between a current instruction signal and the current detection digital signal;
   wherein the voltage detector is capable of detecting an induced voltage developed across a stator coil of each phase of the multiphase DC motor and generating a detected induced voltage;
   wherein, when the multiphase DC motor starts up, the initial acceleration controller becomes controlled and placed in an operating state, and in response to the detected induced voltage generated from the voltage detector, supplies a plurality of initial acceleration output signals specifying a conducting phase for initial acceleration of the multiphase DC motor to the output drive controllers;
   wherein the initial acceleration controller, the output drive controllers, and the output driver make a conducting phase change and perform the PWM drive to provide the initial acceleration of the multiphase DC motor in response to the detected induced voltage and to the error upon startup of the multiphase DC motor, and
   wherein upper-limit duty values for the PWM drive output signals to be supplied from the output drive controllers to the output pre-driver during the period of the initial acceleration can be arbitrarily set in the output drive controllers.

2. The motor drive control device according to claim 1, wherein the detected induced voltage generated from the voltage detector is converted to an induced voltage detection digital signal by the A/D conversion section, and
   wherein, before the initial acceleration, the initial acceleration controller can identify the position of a rotor of the multiphase DC motor from a combination of pieces of polarity information carried by the induced voltage detection digital signal concerning the phases of the multiphase DC motor.

3. The motor drive control device according to claim 2, wherein the initial acceleration controller determines a first conducting phase for the initial acceleration in accordance with the rotor position identified before the initial acceleration.

4. The motor drive control device according to claim 3, wherein the initial acceleration controller makes the conducting phase change when the induced voltage detection digital signal reaches a predetermined reference value after the energization of the first conducting phase for the initial acceleration.

5. The motor drive control device according to claim 4, wherein the motor drive control device further includes input circuits capable of receiving a control signal from the outside of the motor drive control device, and
   wherein a duty control signal, which is used to arbitrarily set the upper-limit duty values for the PWM drive output signals to be supplied from the output drive controllers to the output pre-driver during the period of the initial acceleration, can be supplied from the outside of the motor drive control device to the output drive controllers through the input circuits.

6. The motor drive control device according to claim 5, wherein the initial acceleration controller generates a clamp enable signal during the period of the initial acceleration in response to a start signal for starting the rotation of the multiphase DC motor, which is supplied from the input circuits, and
   wherein, during the period of the initial acceleration, in response to the clamp enable signal generated from the initial acceleration controller, the output drive controllers set the upper-limit duty values for the PWM drive output signals, which are to be supplied to the output pre-driver, in accordance with the duty control signal.

7. The motor drive control device according to claim 6, wherein the initial acceleration controller detects that the induced voltage detection digital signal has not reached the predetermined reference value at a predetermined timing, and then generates a detection signal, which indicates that the predetermined reference value is not reached;
   wherein, in response to the detection signal, which indicates that the predetermined reference value is not reached, the initial acceleration controller generates a low-level sub-reference value that is lower than the predetermined reference value, and
   wherein, when the induced voltage detection digital signal reaches the low-level sub-reference value, the initial acceleration controller makes the conducting phase change.

8. The motor drive control device according to claim 6, wherein the predetermined reference value can be supplied from the outside of the motor drive control device to the initial acceleration controller through the input circuits.

9. The motor drive control device according to claim 6, wherein the voltage detector, the A/D conversion section, the initial acceleration controller, the output drive controllers, and the output driver are integrated in a semiconductor chip having a semiconductor integrated circuit.

10. The motor drive control device according to claim 9, wherein the voltage detector, the A/D conversion section, the initial acceleration controller, the output drive controllers, and the output driver, which are integrated in the semiconductor chip having the semiconductor integrated circuit, are capable of driving the multiphase DC motor, which is a three-phase DC motor serving as a spindle motor for rotating a magnetic disk in a hard disk drive.

11. A method of operating a motor drive control device that includes a voltage detector, an A/D conversion section, an initial acceleration controller, output drive controllers, an output driver, and a current detector,
   wherein the output driver includes a plurality of power transistors and an output pre-driver, the power transistors driving a multiphase DC motor, the output pre-driver driving a plurality of input electrodes of the power transistors;
   wherein the current detector is capable of detecting a motor drive current that flows to the multiphase DC motor;
   wherein the current detector is capable of detecting a motor drive current that flows to the multiphase DC motor, detected information about the motor drive current being converted to a current detection digital signal by the A/D conversion section;
   wherein the output drive controllers supply PWM drive output signals for PWM drive to the output pre-driver in such a manner as to minimize the error between a current instruction signal and the current detection digital signal;
   wherein the voltage detector is capable of detecting an induced voltage developed across a stator coil of each phase of the multiphase DC motor and generating a detected induced voltage;
   wherein, when the multiphase DC motor starts up, the initial acceleration controller becomes controlled and placed in an operating state, and in response to the detected induced voltage generated from the voltage detector, supplies a plurality of initial acceleration output signals specifying a conducting phase for initial acceleration of the multiphase DC motor to the output drive controllers;
   wherein the initial acceleration controller, the output drive controllers, and the output driver make a conducting phase change and perform the PWM drive to provide the initial acceleration of the multiphase DC motor in response to the detected induced voltage and to the error upon startup of the multiphase DC motor, and
   wherein upper-limit duty values for the PWM drive output signals to be supplied from the output drive controllers to the output pre-driver during the period of the initial acceleration can be arbitrarily set in the output drive controllers.

12. The method according to claim 11,
   wherein the detected induced voltage generated from the voltage detector is converted to an induced voltage detection digital signal by the A/D conversion section, and
   wherein, before the initial acceleration, the initial acceleration controller can identify the position of a rotor of the multiphase DC motor from a combination of pieces of polarity information carried by the induced voltage detection digital signal concerning the phases of the multiphase DC motor.

13. The method according to claim 12, wherein the initial acceleration controller determines a first conducting phase for the initial acceleration in accordance with the rotor position identified before the initial acceleration.

14. The method according to claim 13, wherein the initial acceleration controller makes the conducting phase change when the induced voltage detection digital signal reaches a predetermined reference value after the energization of the first conducting phase for the initial acceleration.

15. The method according to claim 14, wherein the motor drive control device further includes input circuits capable of receiving a control signal from the outside of the motor drive control device; and wherein a duty control signal, which is used to arbitrarily set the upper-limit duty values for the PWM drive output signals to be supplied from the output drive controllers to the output pre-driver during the period of the initial acceleration, can be supplied from the outside of the motor drive control device to the output drive controllers through the input circuits.

16. The method according to claim 15,
   wherein the initial acceleration controller generates a clamp enable signal during the period of the initial acceleration in response to a start signal for starting the rotation of the multiphase DC motor, which is supplied from the input circuits, and
   wherein, during the period of the initial acceleration, in response to the clamp enable signal generated from the initial acceleration controller, the output drive controllers set the upper-limit duty values for the PWM drive output signals, which are to be supplied to the output pre-driver, in accordance with the duty control signal.

17. The method according to claim 16,
   wherein the initial acceleration controller detects that the induced voltage detection digital signal has not reached the predetermined reference value at a predetermined timing, and then generates a detection signal, which indicates that the predetermined reference value is not reached,
   wherein, in response to the detection signal, which indicates that the predetermined reference value is not reached, the initial acceleration controller generates a low-level sub-reference value that is lower than the predetermined reference value, and
   wherein, when the induced voltage detection digital signal reaches the low-level sub-reference value, the initial acceleration controller makes the conducting phase change.

18. The method according to claim 16, wherein the predetermined reference value can be supplied from the outside of the motor drive control device to the initial acceleration controller through the input circuits.

19. The method according to claim 16, wherein the voltage detector, the A/D conversion section, the initial acceleration controller, the output drive controllers, and the output driver are integrated in a semiconductor chip having a semiconductor integrated circuit.

20. The method according to claim 16, wherein the voltage detector, the A/D conversion section, the initial acceleration controller, the output drive controllers, and the output driver, which are integrated in the semiconductor chip having the semiconductor integrated circuit, are capable of driving the multiphase DC motor, which is a three-phase DC motor serving as a spindle motor for rotating a magnetic disk in a hard disk drive.

* * * * *